United States Patent
Eggert et al.

(10) Patent No.: US 6,527,558 B1
(45) Date of Patent: *Mar. 4, 2003

(54) INTERACTIVE EDUCATION SYSTEM FOR TEACHING PATIENT CARE

(75) Inventors: John S. Eggert, Miami, FL (US); Michael S. Eggert, Birmingham, AL (US); Phillip Vallejo, Miami, FL (US)

(73) Assignee: Gaumard Scientific, Inc., Miami, FL (US)

( * ) Notice: Subject to any disclaimer, the term of this patent is extended or adjusted under 35 U.S.C. 154(b) by 17 days.

This patent is subject to a terminal disclaimer.

(21) Appl. No.: 09/640,700

(22) Filed: Aug. 17, 2000

Related U.S. Application Data

(63) Continuation-in-part of application No. 09/560,949, filed on Apr. 28, 2000, which is a continuation-in-part of application No. 09/199,599, filed on Nov. 25, 1998, now Pat. No. 6,193,519, which is a continuation of application No. 08/643,435, filed on May 8, 1996, now Pat. No. 5,853,292.

(51) Int. Cl.[7] .............................................. G09B 23/28
(52) U.S. Cl. ........................ 434/262; 434/265; 434/266; 434/267; 434/268; 434/272
(58) Field of Search ................................. 434/262, 265, 434/266, 267, 268, 269, 270, 272

(56) References Cited

U.S. PATENT DOCUMENTS

| | | | |
|---|---|---|---|
| 3,797,130 A | | 3/1974 | Knapp et al. |
| 3,822,486 A | | 7/1974 | Knapp et al. |
| 3,824,709 A | | 7/1974 | Knapp et al. |
| 3,826,019 A | | 7/1974 | Knapp et al. |
| 4,464,123 A | * | 8/1984 | Glover et al. ............... 434/268 |
| 4,907,973 A | * | 3/1990 | Hon .......................... 434/262 |
| 5,509,810 A | | 4/1996 | Schertz et al. |
| 5,769,640 A | * | 6/1998 | Jacobus et al. ............. 434/262 |
| 5,882,206 A | * | 3/1999 | Gillio ......................... 434/262 |
| 6,220,866 B1 | * | 3/2001 | Amend et al. .............. 434/266 |

* cited by examiner

*Primary Examiner*—John Edmund Rovnak
(74) *Attorney, Agent, or Firm*—Haynes and Boone, LLP

(57) ABSTRACT

An interactive education system is described for teaching patient care to a user. The system comprises a patient simulator, as well as a virtual instrument for use with the patient simulator in performing patient care activities. The systems also includes means for sensing an interaction between the virtual instrument and the simulator, and means for providing feedback to the user regarding the interaction between the virtual instrument and the simulator.

In a first embodiment, the simulator and virtual instrument are tangible objects, and in a second embodiment, the simulator and virtual instrument are software-generated objects.

38 Claims, 32 Drawing Sheets

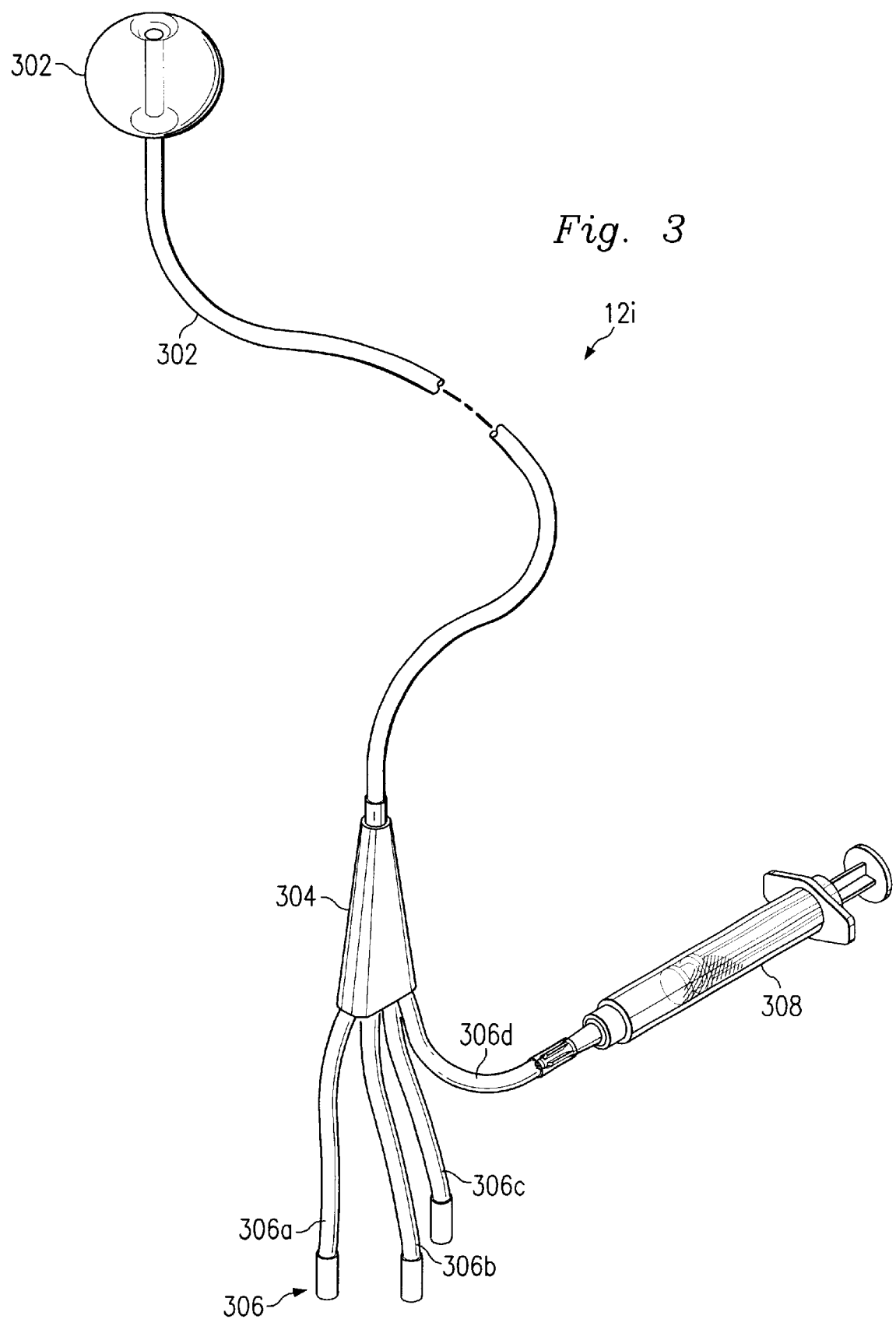

Fig. 6

Intro  CPR  FBO  Practice  Exit

Welcome to the BLS Teaching module. This module consists of the following options:

Intro  CPR  FBO  Practice  Exit

Intro : Learn about CPR theory.

CPR : Review CPR techniques for one and two person CPR.

FBO : Review techniques for Foreign Body Obstruction (FBO) removal.

Practice : Practice CPR using the manikin and virtual CPR monitor.

Exit : Quit the BLS Teaching Module.

CODE BLUE III

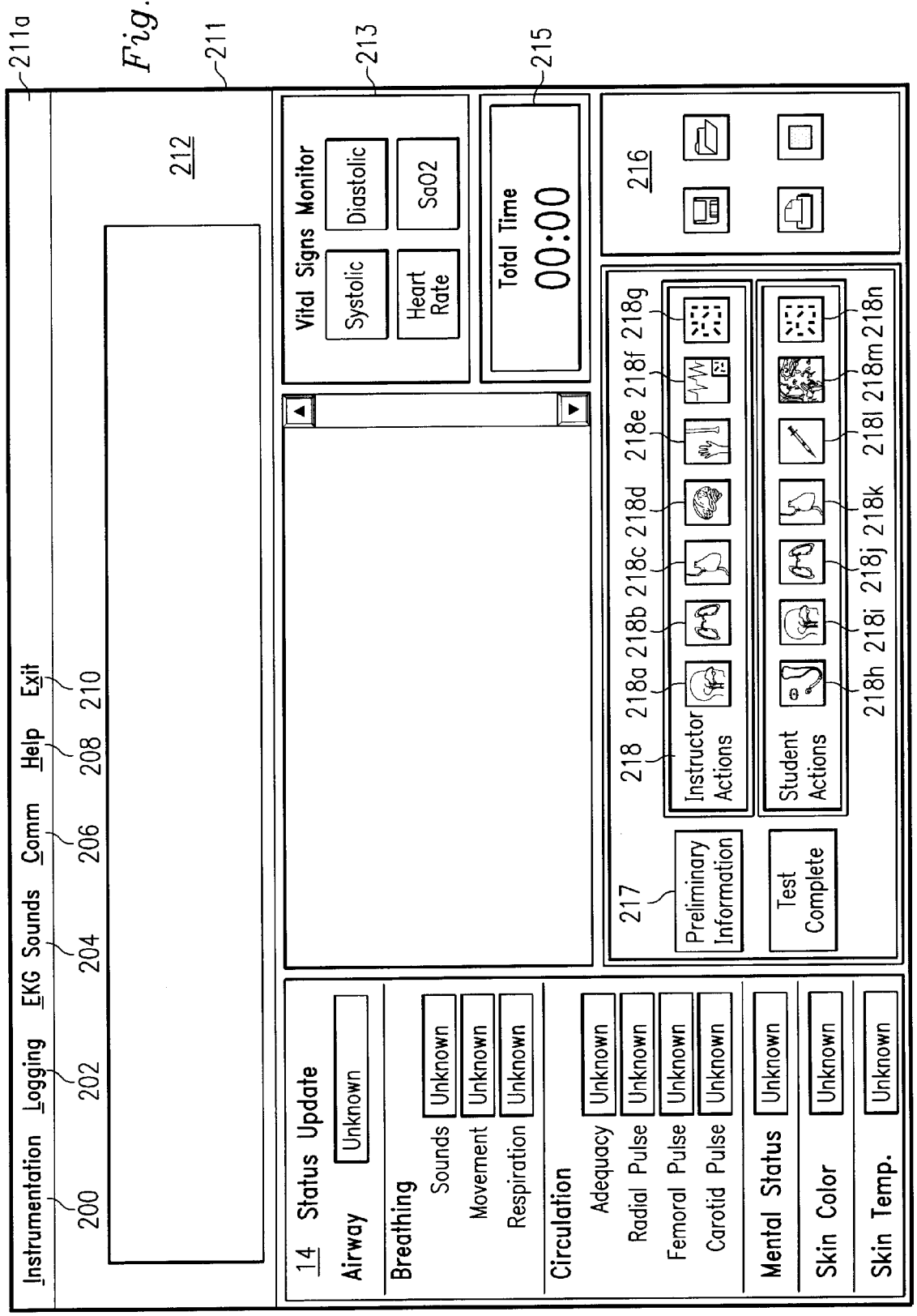

| Instrumentation | Logging | EKG Sounds | Comm | Help | Exit |

Status Update — 14

Airway: Adequate to Ventila

Breathing:
- Sounds: Bilateral
- Movement: Symmetrical
- Respiration: Controlled Circulation:
- Adequacy: Compromised
- Radial Pulse: Yes
- Femoral Pulse: No
- Cartoid Pulse: Yes Mental Status: Alert
Skin Color: Pale
Skin Temp.: Cool

Student Actions — 211

Virtual Instruments

| | Attach | Assess/Perform | Remove |
|---|---|---|---|
| BP/PulseOx | ☐ | ☐ | ☐ |
| EKG | ☐ | ☐ | ☐ |
| Cardioversion | ☐ | ☐ | ☐ |
| Defibrillation | ☐ | ☐ | ☐ |
| External Pacer | ☐ | ☐ | ☐ |

OK

Vital Signs Monitor — 213

| Systolic | Diastolic |
| Heart Rate | SaO2 |

Total Time — 215
05:07

Preliminary Information | Test Complete

Instructor Actions
Student Actions — 218m

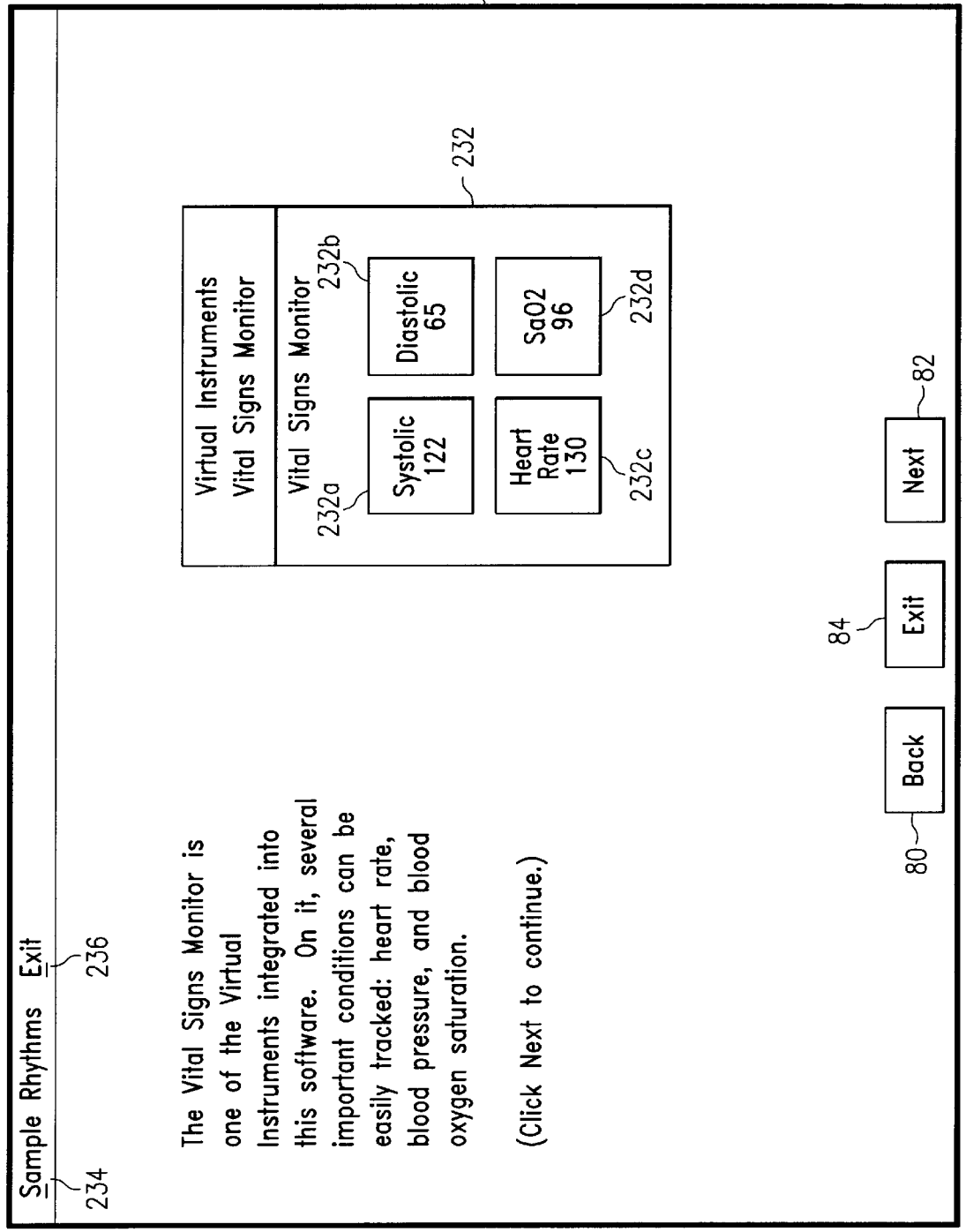

Fig. 20

Sample Rhythms   EKG Sounds   Exit

Virtual Instrument Electrocardiograph

The Virtual EKG Monitor is one of the Virtual Instruments integrated into this software. It is used to display the activity of the heart's conduction system. The display is updated with a sweep, cycling from left to right. To use the EKG monitor, click the ON/OFF button, and the sweep will activate.

(Click Next to continue.)

Back   Exit   Next

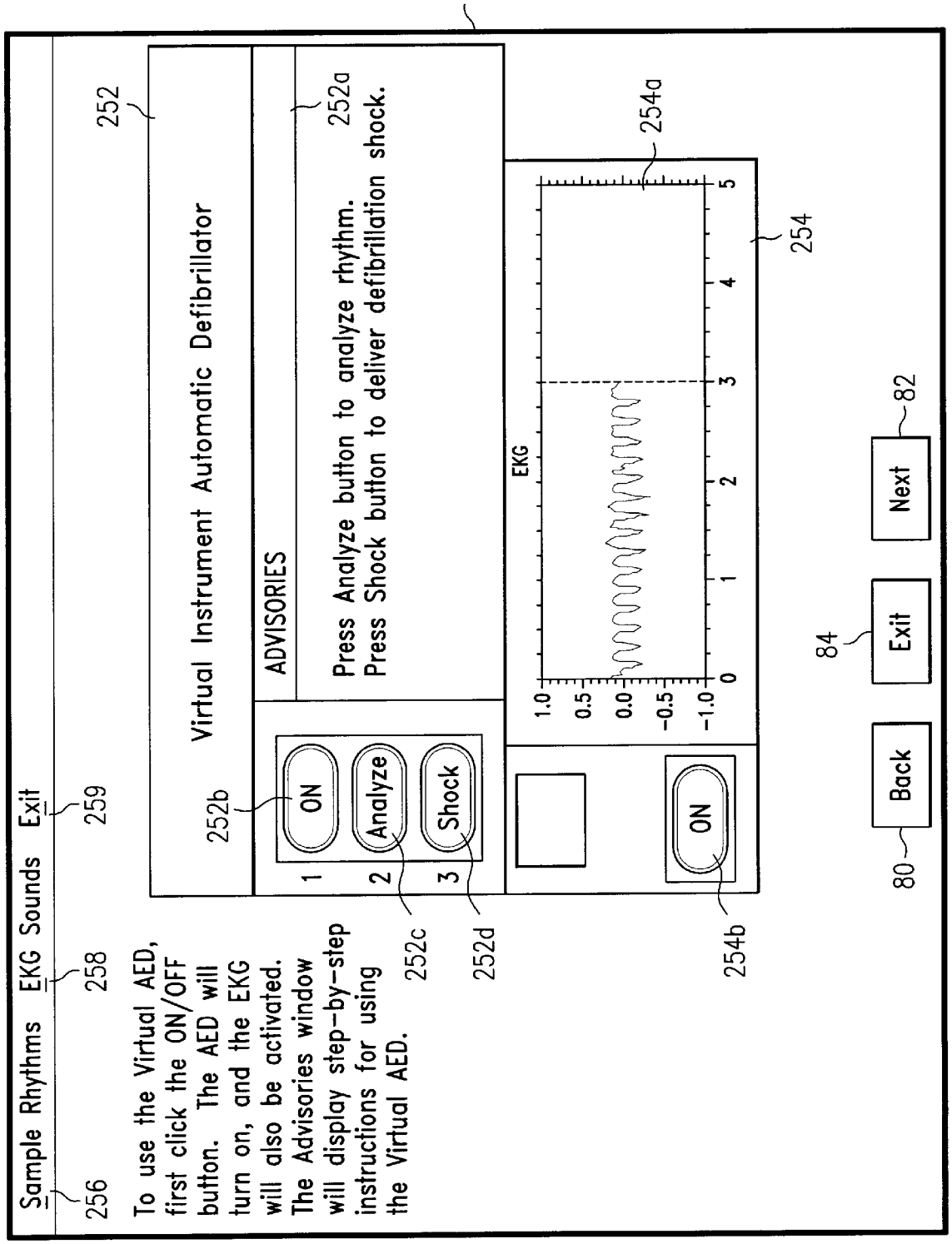

INTERACTIVE EDUCATION SYSTEM FOR TEACHING PATIENT CARE

CROSS-REFERENCE TO RELATED APPLICATION

This application is a continuation-in-part of U.S. Ser. No. 09/560,949, filed Apr. 28, 2000, which is a continuation-in-part of U.S. Ser. No. 09/199,599, now U.S. Pat. No. 6,193,519, filed Nov. 25, 1998, which is a continuation of U.S. Ser. No. 08/643,435, now U.S. Pat. 5,853,292, filed May 8,1996.

BACKGROUND

The present embodiment relates generally to an interactive education system for teaching patient care, and more particularly to such a system having virtual instruments for use in conducting patient care activity on a patient simulator.

While it is desirable to train students in patient care protocols before allowing contact with real patients, textbooks and flash cards lack the important benefit to students attained from "hands-on" practice. Thus, patient care education has often been taught using devices, such as a manikin configured to simulate a patient, along with corresponding medical instruments to perform patient care activity. However, one disadvantage of such a system is that medical instruments are often prohibitively expensive, and consequently, many users must settle for using a smaller variety of instruments, even at the cost of a less comprehensive educational experience. One solution to the foregoing problem is using a set of relatively inexpensive, simulated medical instruments ("virtual" instruments), as taught in U.S. Pat. No. 5,853,292, the entire disclosure of which is hereby incorporated by reference.

Another problem in patient care education is teaching a user to locate and interpret certain patient body sounds. Charts or displays of audible locations are of little practical value, for they do not provide the user with some form of realistic feedback, such as audio, visual, or tactile responses to the user's activity. For example, knowing that an apex heart sound is heard at the fifth intercostal space along the midclavicular line is a very different matter from actually finding the location and recognizing the sound on a patient. In an attempt to provide a more realistic experience, prior methods have disposed speakers playing body sounds at locations throughout a manikin, but this is undesirable, as speakers have a tendency to reverberate throughout the manikin, thus allowing an unnatural juxtaposition of normally distal sounds. Moreover, even if only one sound is played at a time, the nature of a speaker results in the sound being heard over a wider anatomical area than would be found in a real patient, thus reinforcing sloppy sound location and detection by the user.

Therefore, what is needed is an interactive education system using virtual instruments, such as a virtual stethoscope, in cooperation with simulated patient treatment for rewarding the user with realistic audible, and in some cases, visual feedback, thereby enabling a user to learn comprehensive patient care skills.

SUMMARY

The present embodiment, accordingly, provides an interactive education system for teaching patient care to a user. The system comprises a patient simulator, as well as a virtual instrument for use with the patient simulator in performing patient care activities. The systems also includes means for sensing an interaction between the virtual instrument and the simulator, and means for providing feedback to the user regarding the interaction between the virtual instrument and the simulator.

One advantage of the present embodiment is that it provides an interactive education system using virtual instruments in cooperation with simulated patient treatment for rewarding the user with realistic audible, and in some cases, visual feedback, thereby enabling a user to learn comprehensive patient care skills.

BRIEF DESCRIPTION OF THE DRAWINGS

FIG. 2 is a schematic view of the interaction between a set of virtual instruments and the simulator of the system of FIG. 1a.

FIG. 3 is a perspective view of a virtual PA catheter instrument of the system of FIG. 1a.

FIG. 4a is a perspective view of a virtual stethoscope instrument of the system of FIG. 1a.

FIGS. 5–7 are views of screen displays generated by a program of the educational systems of FIGS. 1a–b.

FIGS. 8–17a are schematic views of modules contained in the program.

FIGS. 17b–17f are views of screen displays generated by the program for the Codemaker module.

FIGS. 19–23 are views of screen displays generated by the program relating to virtual instruments of the systems of FIGS. 1a–b.

DETAILED DESCRIPTION

Figure 1A:
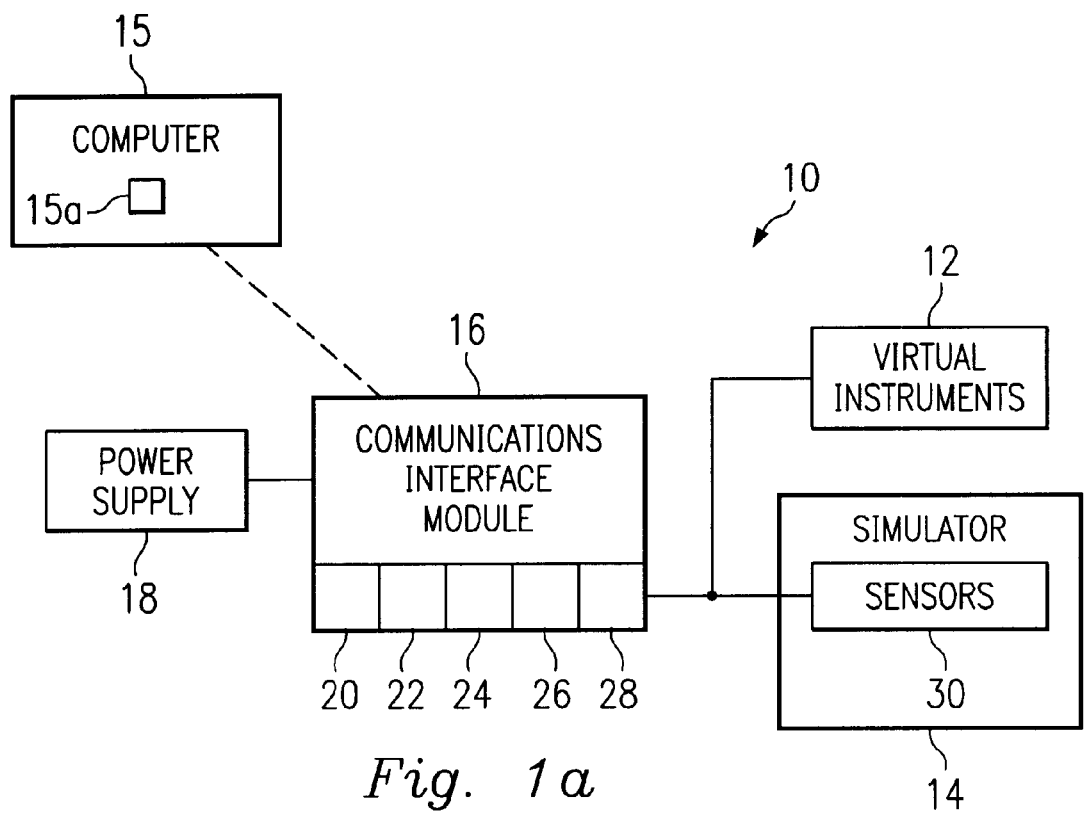
FIG. 1a is a schematic view of an interactive education system for teaching patient care using virtual instruments and a patient simulator.

Referring to FIG. 1a, the reference numeral 10 refers, in general, to an interactive education system for teaching patient care protocols to a user. The system 10 comprises a set of virtual instruments 12 used to simulate medical instruments, and a simulator 14 used to simulate a patient for receiving patient care activity from the user. In this embodiment, the virtual instruments 12 and simulator 14 are tangible objects. Thus, the virtual instruments 12 look, feel, and operate like real medical devices in conjunction with the simulator 14, which is understood to encompass a variety of forms, including a fully articulating and adult-sized manikin, as well as a fetus, a neonate, a child, a youth, or portion of a manikin, such as the arm, torso, head, or pelvic region.

Patient care activity received by the simulator 14 is sensed in a manner to be described, and in response to the activity, the system 10 provides feedback to the user. It is understood that feedback may comprise any audio, visual, or tactile response.

Figure 1B:
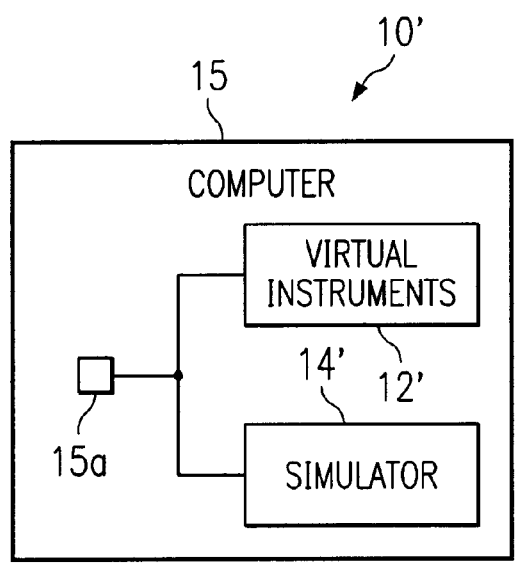
FIG. 1b is a schematic view of an interactive education system for teaching patient care using software-generated virtual instruments and a software-generated patient simulator.

Referring to FIG. 1b, a system 10' comprises a computer 15 having a program 15a a portion of which produces a software-generated set of virtual instruments 12' and a software-generated simulator 14'. Thus, the patient care activity performed by the user comprises manipulating an icon relating to a selected software-generated virtual instrument 12' to provide patient care to the software-generated simulator 14'. In this embodiment, the program 15a uses conventional means, such as clicking the mouse or voice-activated software, to monitor activity by the user, and provides feedback in response, as will be described.

Returning to FIG. 1a, the system 10 further comprises a communications interface module ("CIM") 16, which receives operating power from a conventional power source 18, and contains a microcontroller ("PIC") 20. Microcontrollers are available from many vendors, such as Microchip Technology, Inc. (Chandler, Ariz.), and are then customized.

As will be described, the PIC 20 receives input signals from the user's activity, and is programmed to respond in a certain manner to provide feedback to the user. For example, to provide audio feedback, the CIM 16 additionally includes an audio chip 22 which is responsive to the PIC 20 for causing a speaker 24 to produce realistic patient sounds, for example, heart, lung, blood pressure (Korotkoff), intestinal, and the like. A control 26 is included in the CIM 16 for adjusting the volume of the speaker 24.

Alternatively, depending on the complexity of the desired feedback, the CIM 16 may be connected to the computer 15 and program 15a. In the present example of audio feedback, the program 15a could be used to provide a vast library of body sounds.

The CIM 16 has a plurality of ports, collectively 28, for receiving input signals occasioned by interaction between the virtual instruments 12 and sensors 30 disposed on the simulator 14, resulting from the user's patient care activity. It is understood that the interaction between the virtual instruments 12 and the sensors 30 may be electrical, optical, pressure differential, tactile, temperature-controlled, or wireless, and furthermore, that there may be more than one PIC 20, and more than one CIM 16, to manage the input signals thus created.

Figure 2:
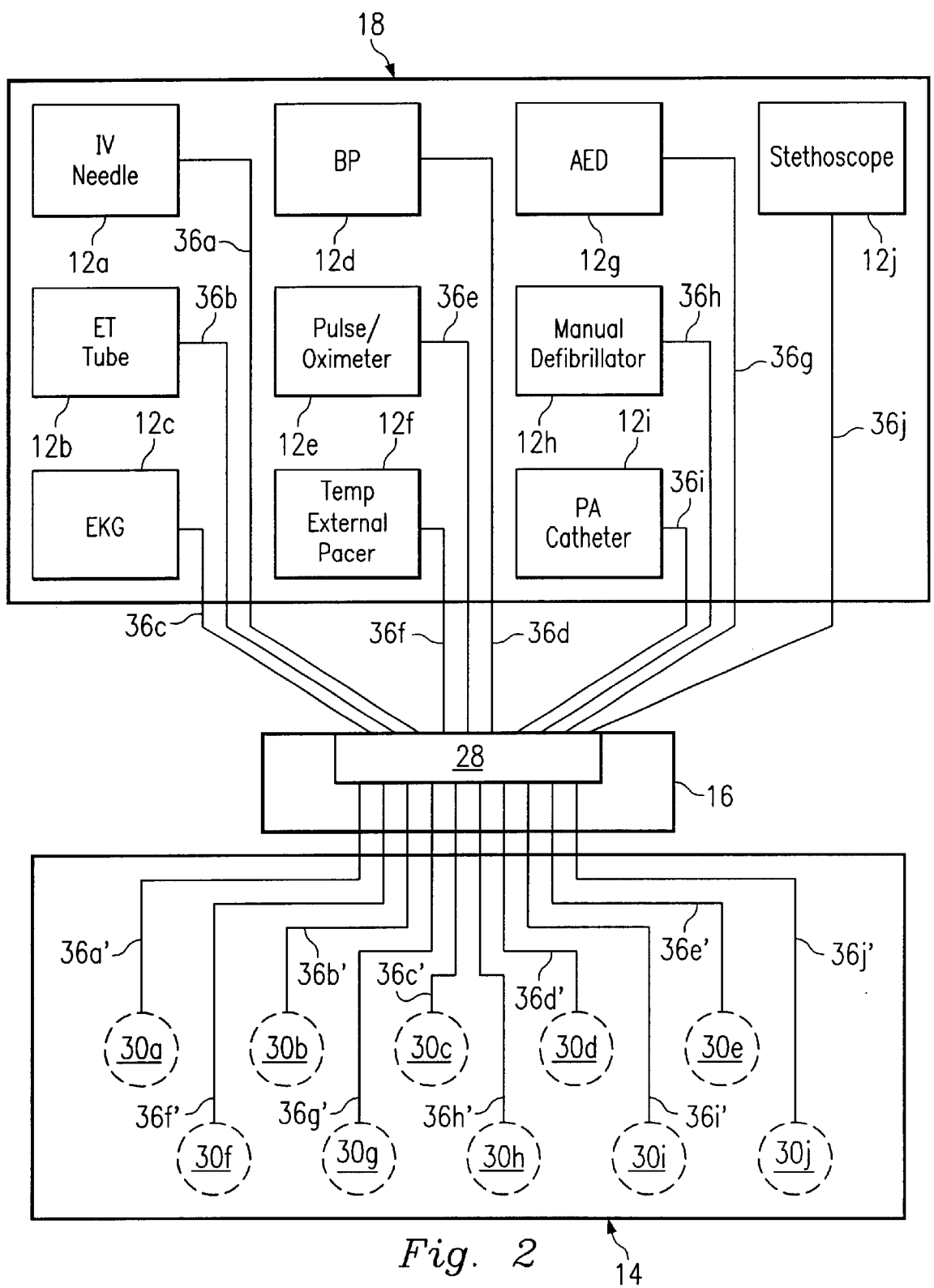

Referring to FIG. 2, the virtual instruments 12 include at least one IV needle, an endotracheal (ET) tube, an electrocardiogram (ECG or EKG) monitor, a blood pressure (BP) cuff, a pulse oximeter cuff, a temporary external pacer, an automatic external defibrillator (AED), a manual defibrillator, a pulmonary artery (PA) catheter or similar hemodynamic monitoring device, and a virtual stethoscope, respectively 12a–j, each instrument having a corresponding sensor 30a–j, as indicated by lines, collectively 36. Unless otherwise indicated, the lines 36 are schematic, and merely illustrate that the virtual instruments 12 and the sensors 30 are functionally connected to each other for providing an interaction created by the user's patient care activity, the interaction being reported as an input signal to the CIM 16. When one of the lines 36 also represents a physical connection, it will be noted, and it is understood that the sharing of such physical lines among instruments 12, or sensors 30, is contemplated as well.

The IV needle 12a corresponds with a portion of the simulator 14 capable of accepting medications. Generally speaking, an electrical interaction (which would also provide the input signal) could be created via a virtual instrument 12 having one node and a sensor 30 with another node, both of which are physically connected to the CIM 16, or by a virtual instrument with two nodes and a sensor formed of conductive material, or vice versa, only one of which may be physically connected to the CIM 16. In the present embodiment, the antecubital region of an arm of the simulator 14 may have a sensor 30a comprising an insulator sandwiched between two layers of conductive material having an appropriate thickness and weave density for permitting the needle 12a to pass through the cloth at a low acute angle (e.g., 20°). The conductive layers of the sensor 30a are electrically coupled to the CIM 16 via line 36a', such that when the needle 12a is correctly passed through the two conductive layers, simulating cannulation of a vein of the simulator 14, a circuit is completed between the layers and sensed by the CIM 16. In one embodiment, the needle 12a has a selectable group of specific drugs and dosages provided by the program 15a, and is part of a medication tray with an assortment of labeled syringes for dispensing the drugs to the simulator 14, with the effects of administration controlled by the program 15a.

The ET tube 12b is used in simulated patient airway management, the simulator 14 having a head, eyes, a nose, a mouth, and a realistic airway capable of accepting conventional airway adjuncts, with the airway configuration adjustable to display a large tongue, an obstructed pharynx, or closed vocal cords, to increase the difficulty of the patient care activity. In order to confirm proper placement in the tracheal airway of the simulator 14, an optical sensor 30b is mounted in the wall of the trachea of the simulator 14 and connected to the CIM 16 via line 36b'. Correct placement of the ET tube 12b in the trachea is confirmed when the tip of the ET tube interrupts the beam of the optical sensor 30b. The sensor 30b may also be used to determine whether a fluid has passed. The sensor 30b could alternatively be an electrical device.

The ECG monitor 12c comprises a multi-lead system, including a real-time trace monitor and R-wave sonic markers, and a line 36c that connects to the CIM 16 at one end, and has a plurality of color-coded patches at the opposite end for attachment to a plurality of sensors, collectively 30c, mounted on the correct regions of the torso of the simulator 14. The electrical interaction between the patches and the sensors, as sensed by the CIM 16, confirms proper placement.

The BP cuff 12d attaches to the simulator 14, for example around an arm, and includes a line 36d that attaches to the CIM 16. The simulator 14 contains a simulated heart, lungs, and other organs. Palpable pulses may be found at carotid, brachial, radial, femoral, and dorsalis pedis locations, and may change to represent the condition of the simulated patient; for example, specific pulse locations may become non-palpable as the systolic pressure falls. The cuff 12d includes means 30d for sensing proper positioning of the cuff 12d on the simulator 14, and is attached to the CIM 16 via line 36d.

The pulse oximeter finger cuff 12e attaches to the simulator 14, for example around a finger, and includes a line 36e that attaches to the CIM 16. Normal gas exchange lung dynamics are virtual and are controlled by the program 15a, which may also determine tidal volumes (TV) and functional residual capacity (FRC). The cuff 12e includes means 30e for sensing proper positioning of the cuff 12e on the simulator 14.

The temporary external pacer 12f contains a line 36f that connects to the CIM 16 at one end, and has a plurality of anterior and posterior pacer pads at the opposite end for attachment to a plurality of sensors, collectively 30f, mounted on the correct regions of the torso of the simulator 14. In this manner, the CIM 16 confirms proper placement of the temporary external pacer 12f on the simulator 14. The pacer 12f has means for controlling pacer rate, cap time, and current, as well as exhibiting rhythm pacing, which is controlled by the program 15a.

The automatic external defibrillator (AED) 12g contains a line 36g that connects to the CIM 16 at one end, and has an apex and sternum AED pad at the opposite end for attachment to sensors, collectively 30g, mounted on the correct regions of the torso of the simulator 14, confirming via the CIM 16 that the AED 12g is properly placed on the simulator. Upon selecting a software generated shock button, the system 10 simulates defibrillation shock, with the resultant conditions controlled by the program 15a.

The manual defibrillator 12h contains a line 36h that connects to the CIM 16 at one end, and has apex and sternum defibrillator paddles at the opposite end for attachment to a plurality of sensors, collectively 30h, mounted on the correct regions of the torso of the simulator 14, confirming via the CIM 16 that the manual defibrillator 12h is properly placed on the simulator. Upon selecting a software-generated shock button, or alternatively, by using dual shock buttons associated with manual defibrillator 12h, the system 10 simulates defibrillation shock, with the resultant conditions controlled by the program 15a.

Referring to FIGS. 2 and 3, the PA catheter, or similar hemodynamic monitor, 12i is an endovascular catheter for insertion in central vein sites (not depicted) of the simulator 14. The PA catheter 12i comprises a long tube 300, with an inflatable balloon 302 at one distal end. The opposite end of the tube 300 contains a divider 304, having a plurality of connectors 306a–d. Connector 306a is for proximal injectate; connector 306b is for distal injectate; and connector 306c reports the pulmonary artery (PA) pressure. Connector 306d is connected to a syringe 308 for providing pressure to the balloon 302 for inflation. Proper placement of the balloon 302 is determined by sensors 30i placed in the simulator 14, and catheter data comprising important hemodynamic indices such as PA occlusion pressure, cardiac output, and mixed venous oxygen saturation are created by the program 15a.

Figure 4A:
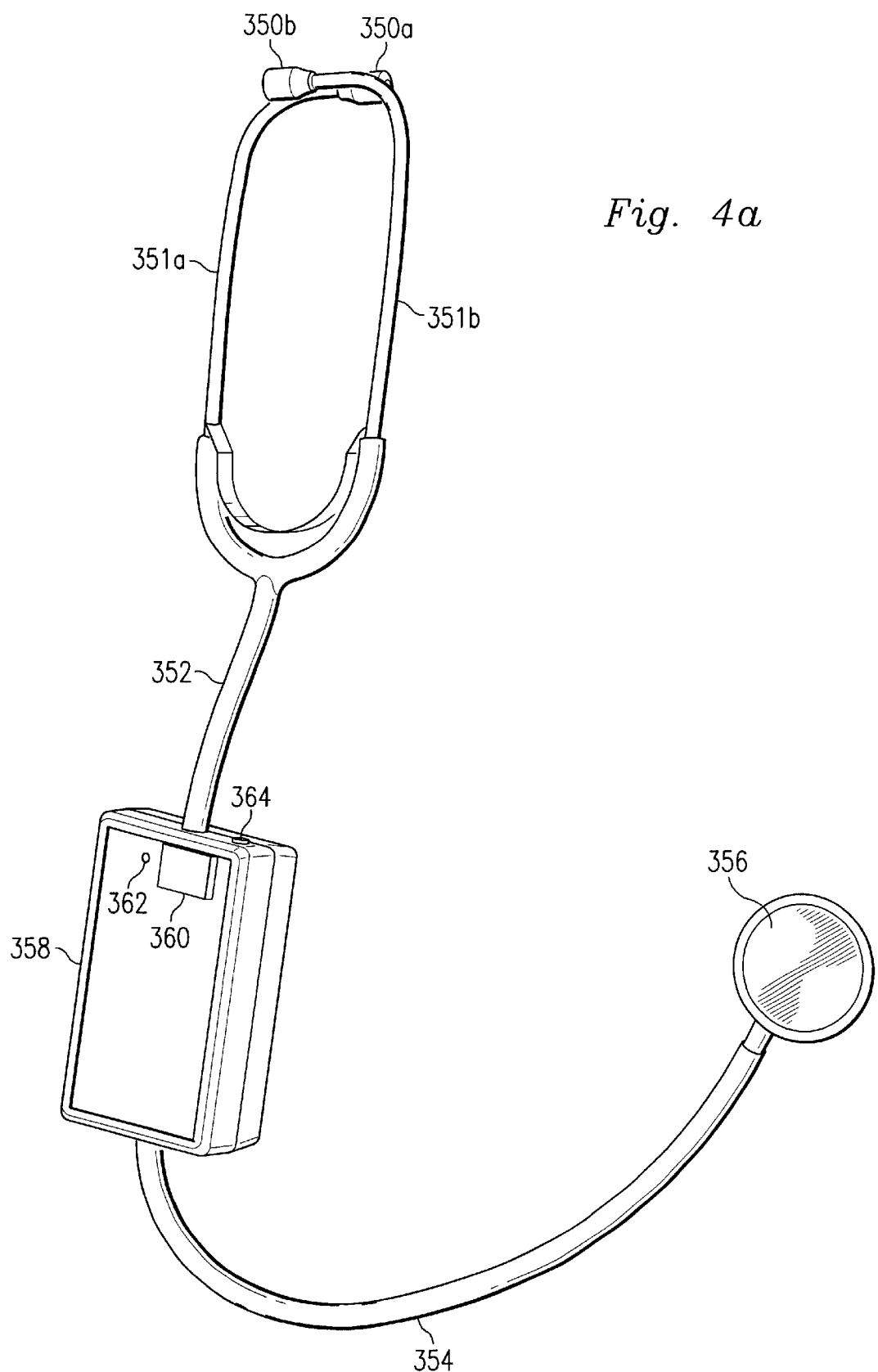

Referring to FIGS. 2 and 4a, the stethoscope 12j is moved from anatomical location to location on the simulator 14, engaging sensors 30j as will be described, to allow the user to hear realistic patient body sounds. In some respects, the appearance of the stethoscope 12j resembles a standard stethoscope, having earpieces 350a–b for hearing sounds, and being connected to extenders 351a–b, which are joined to a bifurcated ear tube 352. Similarly, the stethoscope further comprises a bell tube 354, and a bell 356, preferably made of nonferrous material.

Unlike conventional stethoscopes, an electronic control box 358 is disposed between the ear tube 352 and the bell tube 354. The control box 358 has an On/Off button 360 for activating the stethoscope 12j, and a conventional indicator 362 for indicating a potential loss of operating power, such as a low battery. A jack 364 is provided on the control box 358 for output to an external speaker (not depicted), so that other users may hear the sounds heard in the earpieces 350a–b. This not only increases the number of users who benefit from the patient care activity, but allows an instructor to test the user's ability, and correct the user's technique if required.

Figure 4B:
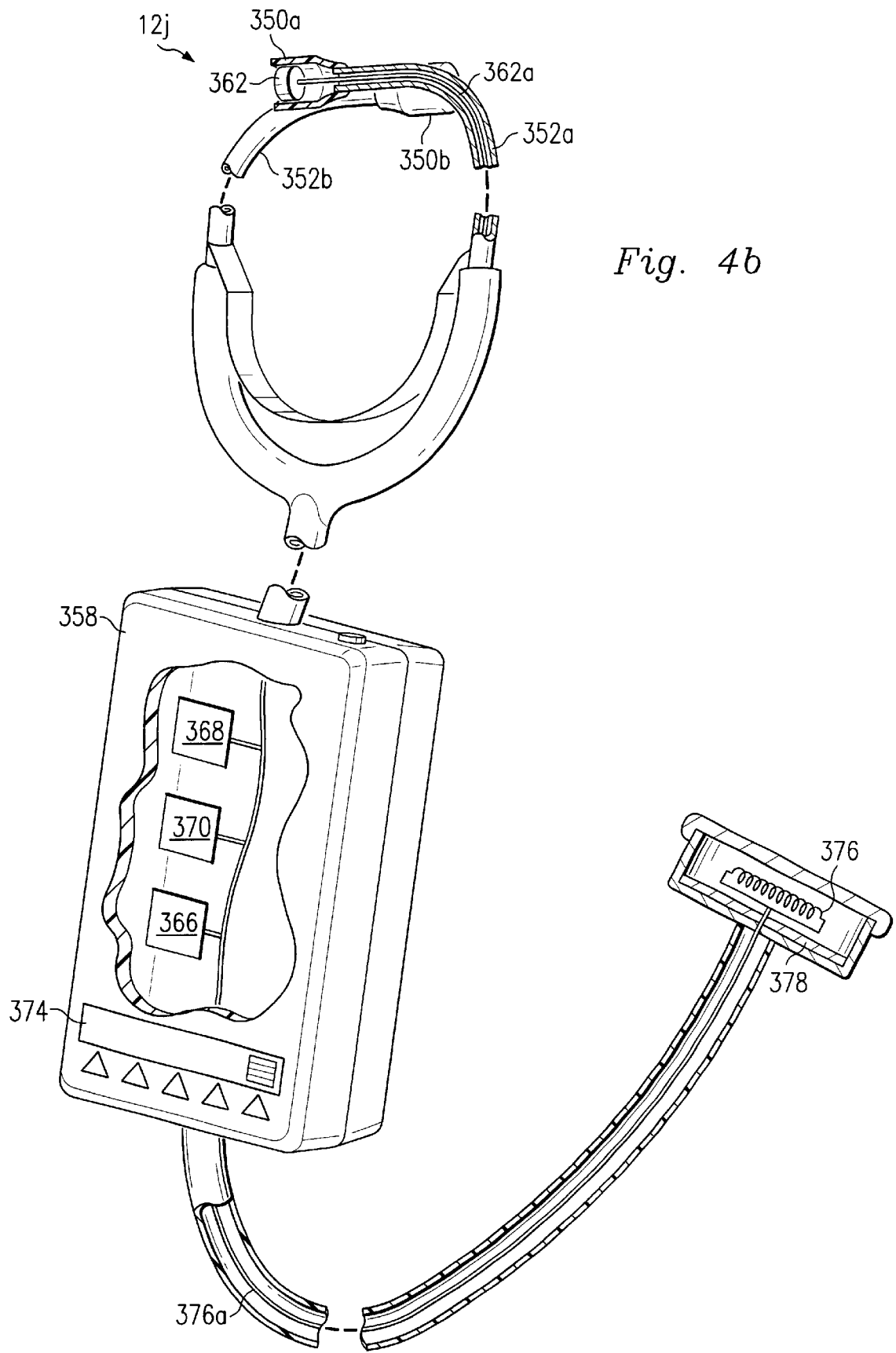
FIG. 4b is a perspective view with a cutaway of the virtual stethoscope instrument.
Figure 4C:
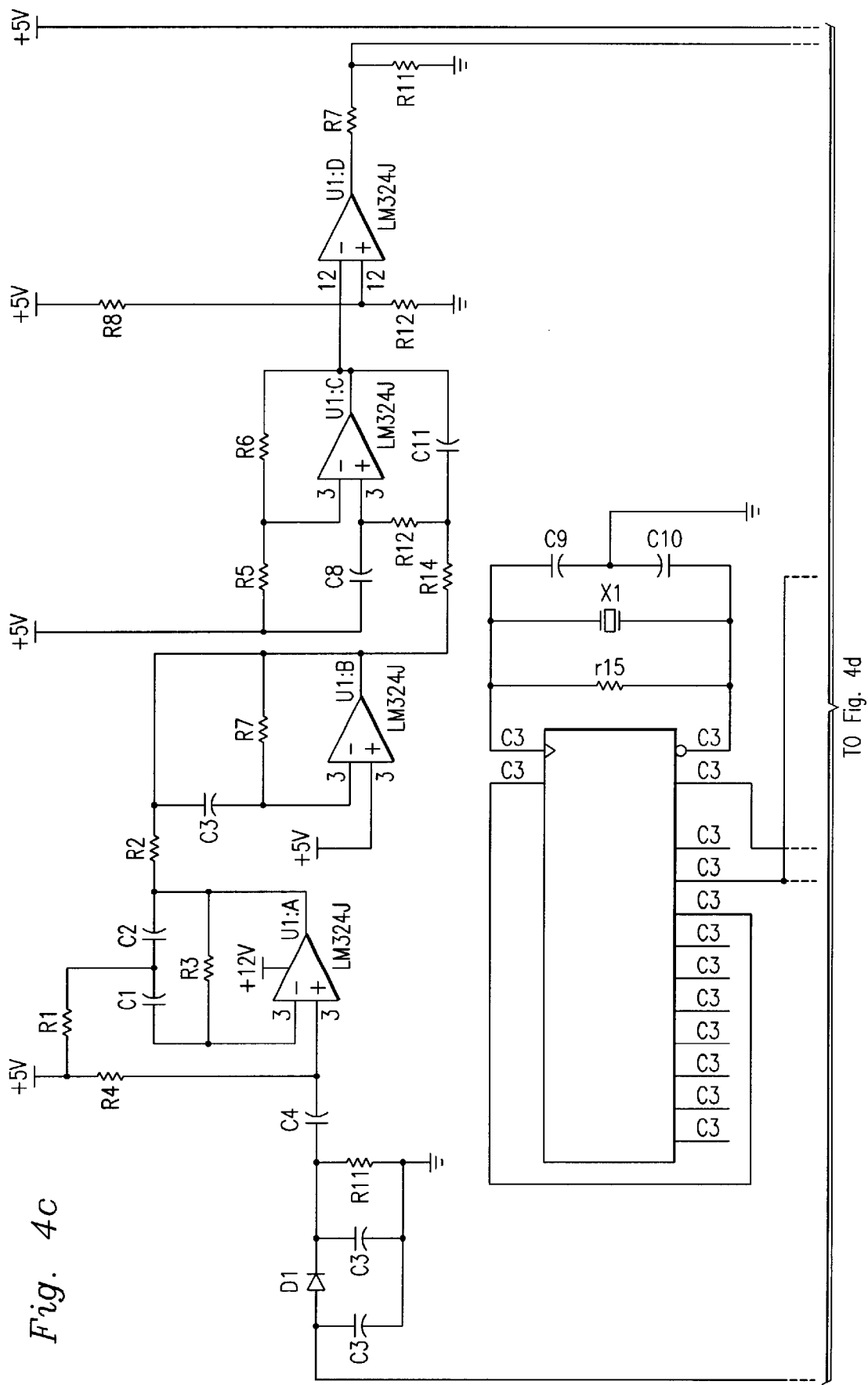
FIGS. 4c and 4d are a circuit diagram for an acquisition control device of the virtual stethoscope instrument.
Figure 4D:
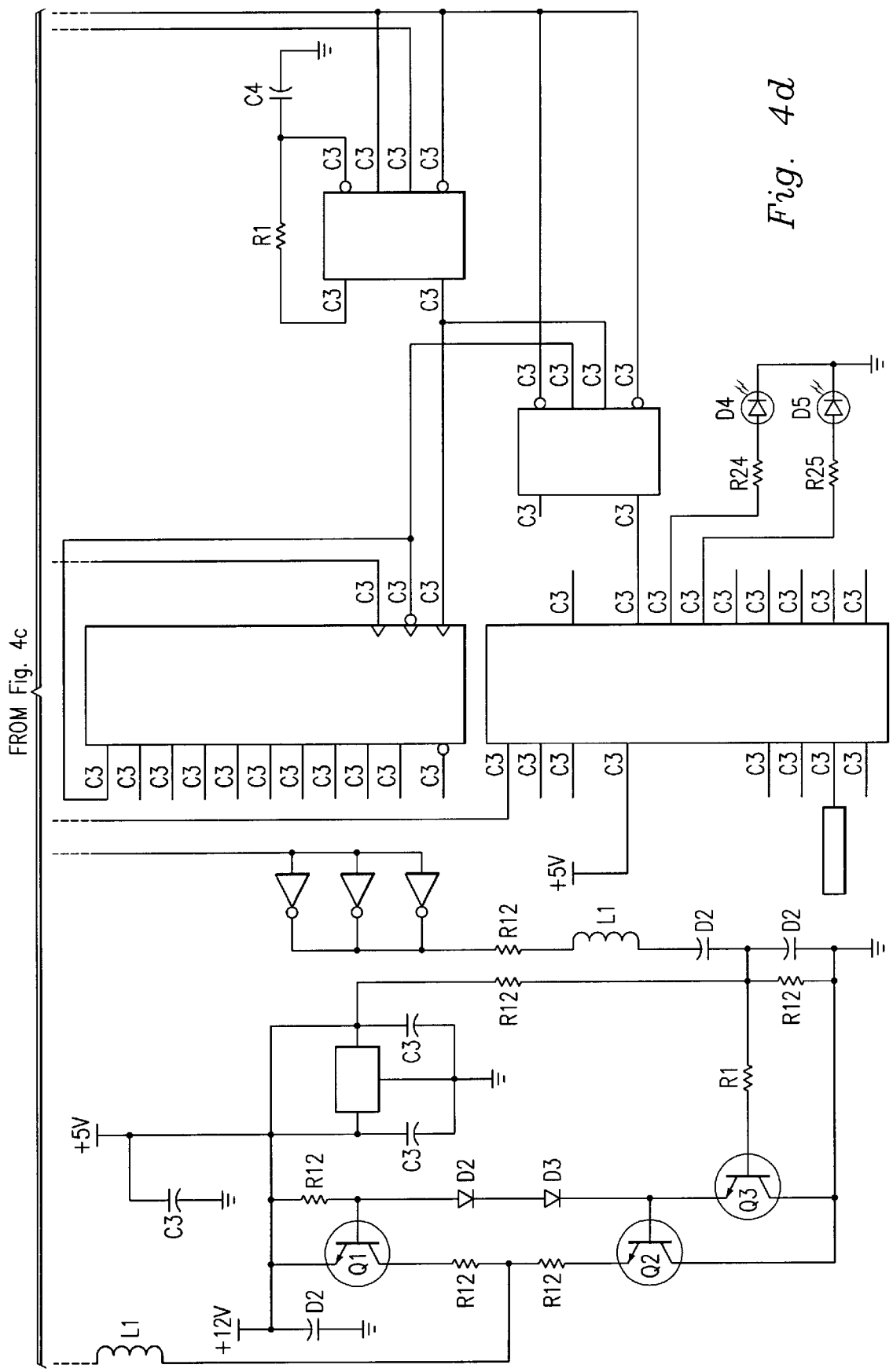

Turning to FIG. 4b, the control box 358 retains a small power source 366, such as a battery, an acquisition circuit 368 (FIGS. 4c and 4d) for reasons to be described, and a sound circuit 370 (FIG. 4e) for directing a small speaker 372, such as is available from ADDAX Sound Company (Northbrook, Ill.), to play a predetermined sound. FIGS. 4f and 4g represent an alternative circuit diagram according to another embodiment of the circuits of FIGS. 4c–4e, which uses less components.

Figure 4E:
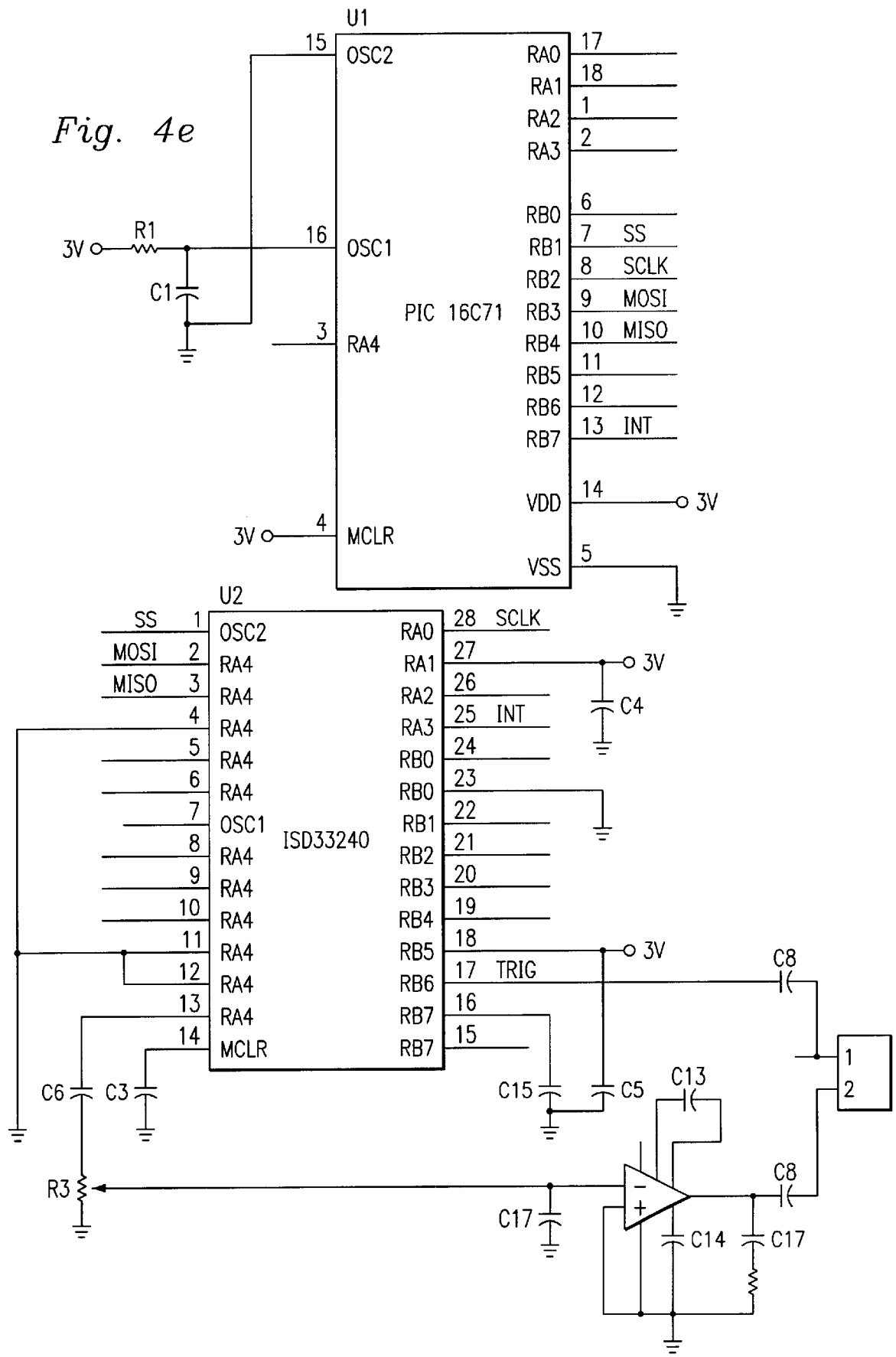
FIG. 4e is a circuit diagram for a sound control feature of the virtual stethoscope instrument.
Figure 4F:
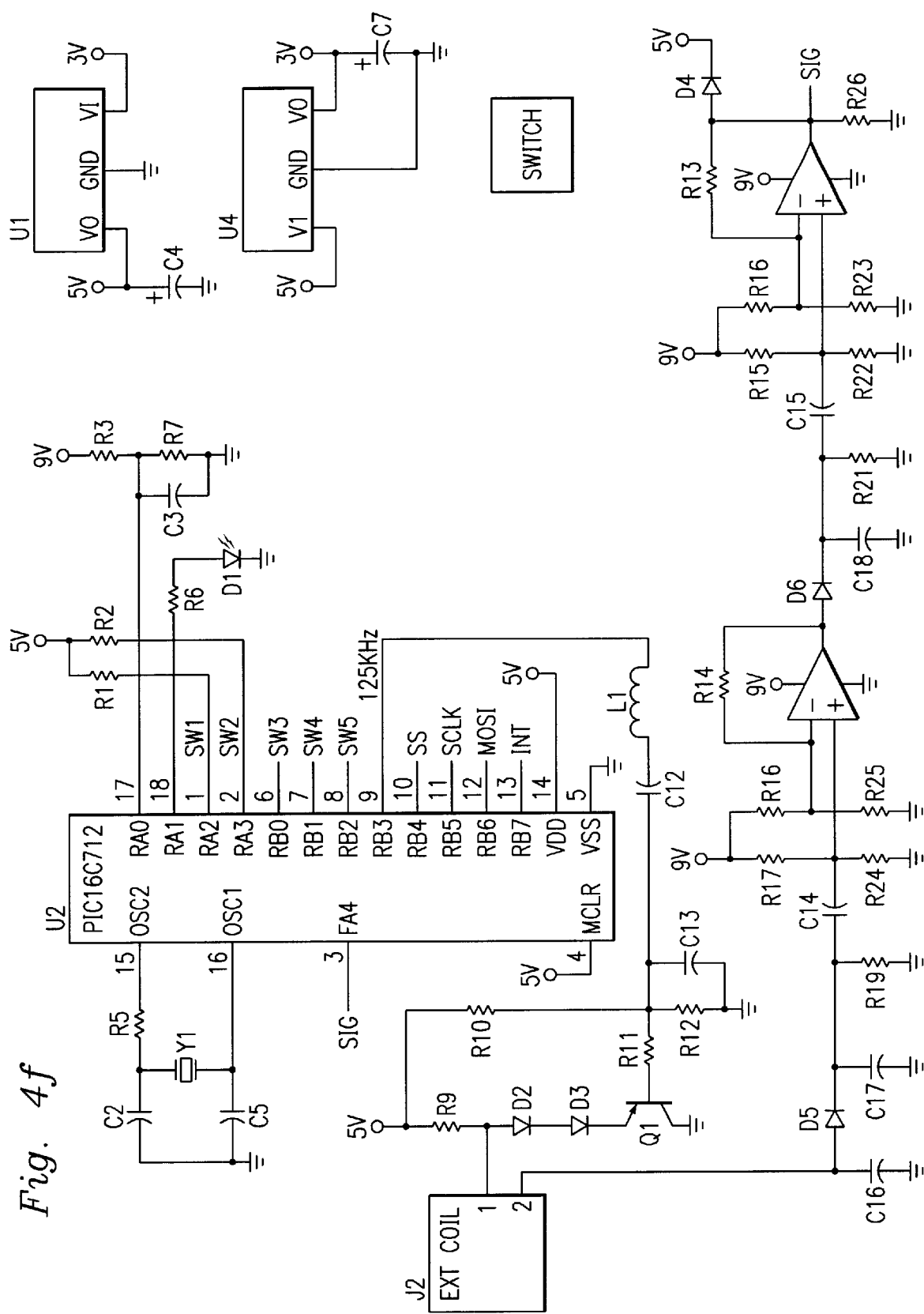
FIGS. 4f and 4g form a circuit diagram according to another embodiment of the circuits of FIGS. 4c–4e.
Figure 4G:
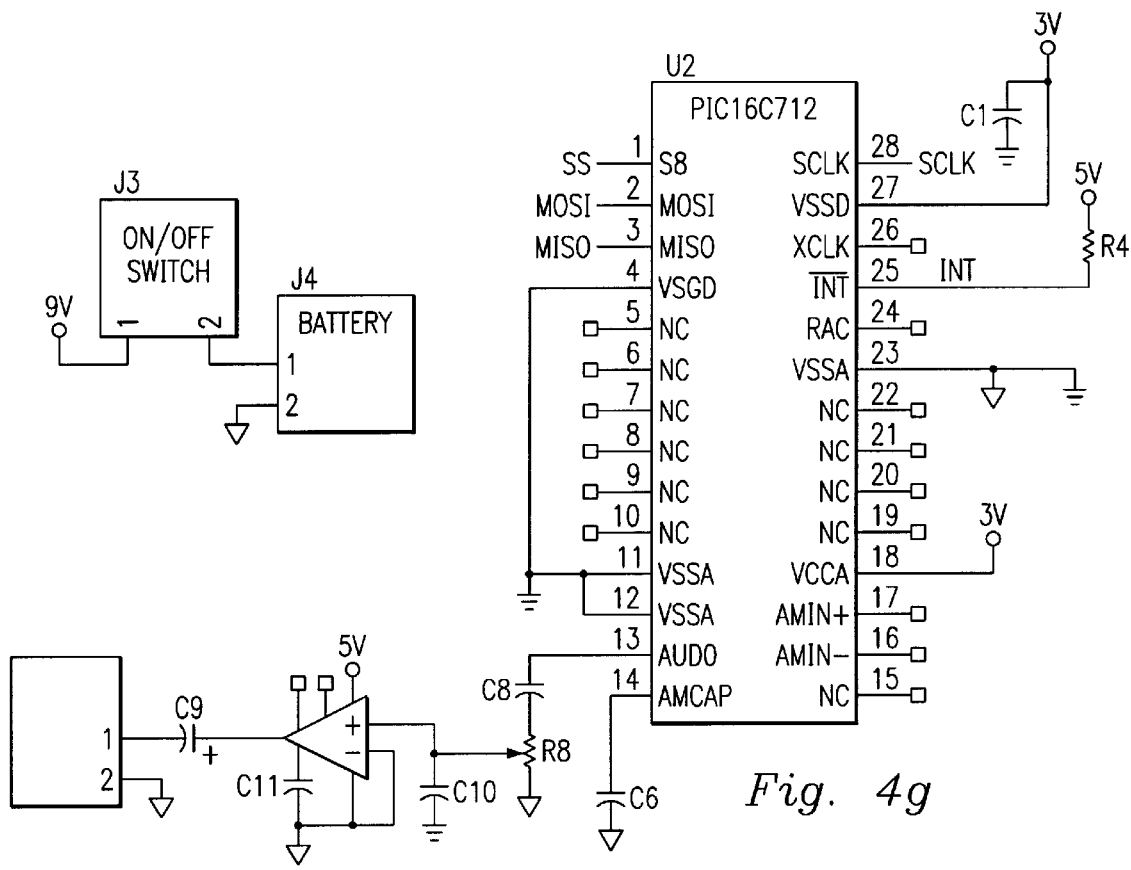

The speaker 372 is disposed in the earpiece 350a, and connected to the control box 358 via a wire 372a, allowing the user to hear the sounds produced by the sound circuit 370 (FIG. 4e). It is understood that a second, substantially identical speaker may be disposed in the opposite earpiece 350b, and also connected to the control box 358. The sound circuit 370 is also connected to the jack 364 for allowing connection to an external speaker for the above-described reasons. In an alternative embodiment, the speaker may be disposed in the control box, and sounds transmitted via conventional ear tubes to the ear pieces.

A switch 374, having a number of positions, is disposed on the control box 358 for switching between groups of sounds, as will be described.

An RF (radio frequency) signal acquisition coil 376, such as is available from M. C. Davis Co. (Arizona City, Ariz.), is disposed in the interior of the bell 356 for transmitting and acquiring RF signals, as will be explained. The acquisition coil 376 is a copper coil and circuitry having an associated wire 376a, which is attached to the electronic control box 358. A polymeric disc 378 is disposed between the acquisition coil 376 and the bell 356 to decrease noise from the bell.

Figure 4H:
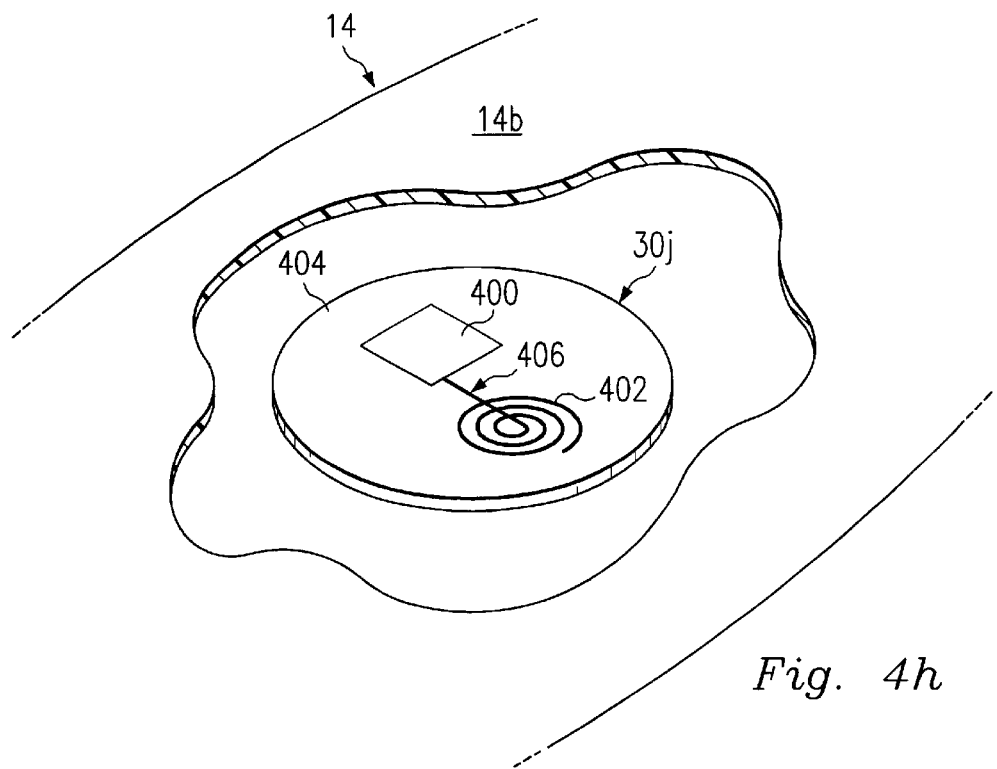
FIG. 4h is a perspective view with a cutaway of a sensor for cooperating with the virtual stethoscope instrument.

Referring to FIG. 4h, at least one sensor 30j is placed at an anatomical location on the simulator 14 where specific heart, lung (including airway), Korotkoff, or other sounds are normally heard. The sensor 30j provides at least one signal which is identified by the acquisition circuit 368 (FIGS. 4c and 4d) of the stethoscope 12j, thereby directing the sound circuit 370 (FIG. 4e) to play a sound to the user appropriate for the anatomical location of the sensor on the simulator 14. It is understood that the sound circuit 370 (FIG. 4e) has a stored library of body sounds corresponding to the location of the selected sensor 30j, and that the sensor 30j represents any number of similar sensors.

The sensor 30j is disposed beneath the skin 14b of the simulator to avoid visual detection by the user. Likewise, it is advantageous that the sensor 30j have a minimal thickness to prevent intentional or accidental detection, as some anatomical locations, for example, intercostal spaces, must be palpated in order to be located. In an alternative embodiment, the sensors 30j may be affixed to an overlay (not depicted) substantially similar to the skin 14b, thus allowing the overlay to be placed over other simulators and models of patients, thereby converting those devices to allow them to be used with the stethoscope 12j.

The sensor 30j comprises an RF ID tag 400, such as is available from Microchip Technology, Inc. (Chandler, Ariz.) (Part No. MCRF200-I/3C00A), which may be programmed using "Developer's Tools" also sold by Microchip Technology, Inc. to engender a unique signal that serves to identify the particular sensor 30j. A coil 402, such as is available from M. C. Davis Co. (Arizona City, Ariz.), is operably connected to the tag 400. The tag 400 and coil 402 are potted in RTV potting material 404, or silicon rubber, such as is available from M. C. Davis Co. (Arizona City, Ariz.), to prevent damage. Once potted, the tag 400 and coil 402 collectively form an RF transmitter 406 which emits a signal comprising a unique train of frequencies.

In operation, referring to FIGS. 4b and 4h, the transmitter 406 may actively broadcast the frequencies, but preferably the transmitter is passive, that is, only activated when interrogated by the acquisition coil 376 in the stethoscope bell 356. In this preferred embodiment, the acquisition coil 376 delivers a carrier signal, such as a 125 kHz excitation frequency, which is received by the transmitter 406 when the bell 356 is brought within a predetermined proximity, or acquisition distance, of the transmitter. The acquisition distance of the bell 356, and therefore the acquisition coil 376, to the transmitter 406 is determined by the strength to noise (S/N) ratio of the carrier signal. Thus, adjustment of the S/N ratio of the carrier signal provides a means for controlling the precision with which the user must place the stethoscope bell 356 in relation to the anatomical location of the sensor 30j, and therefore the transmitter 406. Precise placement of the bell 356 on the simulator 14 by the user is rewarded with feedback, in the form of an appropriate body sound. Normally, the S/N ratio is set to require that the bell 356 be brought within approximately one-half to two centimeters of the transmitter 406 of the sensor 30j.

In response to receiving a sufficiently strong carrier signal, the transmitter 406 emits a train of two identifying frequencies for use in a process conventionally known as frequency shift keying (FSK), although other keying methods could be used. The acquisition coil 376 in the stethoscope bell 356 receives the emitted frequencies and relays the signal to the acquisition circuit 368 (FIGS. 4c and 4d). The acquisition circuit 368 (FIGS. 4c and 4d) determines the identity of the sensor 30j. As the anatomical position of each sensor 30j is known to the programmer, a selection of appropriate body sounds associated with each sensor is provided, and accessible to the sound circuit 370 (FIG. 4e). Thus, by identifying the sensor 30j, the acquisition circuit 368 (FIGS. 4c and 4d) directs the sound circuit 370 (FIG. 4e) to play an appropriate body sound for the anatomical position of the transmitter 406, which is heard by the user through the speaker 372 disposed in the earpiece 350a.

It can be appreciated that to expose the user to a greater selection of sounds, more sensors 30j could be added to the simulator 14, or each sensor could correspond to more than one sound. As depicted, the switch 374 (FIG. 4b) has five different positions, and includes means for switching the sound circuit 370 (FIG. 4e) between five different groups of sounds. Thus, it is understood that the number of switch positions corresponds to the number of sounds that can be produced by a single sensor, i.e., with thirteen sensors and five switch positions, the user could listen to up to sixty-five location-appropriate sounds, including examples of normal and abnormal sounds. As shown in Table 1, the exemplary normal and abnormal sounds may be those heard in an adult patient.

TABLE 1

| Sensor Location | Position 1 | Position 2 | Position 3 | Position 4 | Position 5 |
|---|---|---|---|---|---|
| Base Right | Base Sounds | Base Sounds | Fixed Split S2 | Fixed Split S2 | Fixed Split S2 |
| Base Left | Physio-logical Split S2 | Physio-logical Split S2 | Physio-logical Split S2 | Split S2 | Split S2 |
| LLSB | Para-doxical Split S2 | Opening Snap | Opening Snap | Friction Rub | Friction Rub |
| Apex | Apex Sounds | Mid-Systolic Click | S3 | Inter-mittent S4 | Starr-Edwards Valve |

TABLE 1-continued

| Sensor Location | Position 1 | Position 2 | Position 3 | Position 4 | Position 5 |
|---|---|---|---|---|---|
| Trachea | Tracheal Sounds | Tracheal Sounds | Stridor Sounds | Stridor Sounds | Stridor Sounds |
| Upper Anterior | Bronchial Sounds | Bronchial Sounds | Wheezing Sounds | Wheezing Sounds | Wheezing Sounds |
| Lower Anterior Posterior | Bronchial Sounds Ronchi Crackles | Wheezing Sounds Coarse Crackles | Pleural Friction Coarse Crackles | Pleural Friction Pulmonary Edema | Med - Fine Crackles Pulmonary Edema |

Likewise, as shown in Table 2, the exemplary normal and abnormal sounds may be those heard in a child. Of course, the sounds listed in Tables 1 and 2 are given merely for illustrative purposes, and any number of different sounds are contemplated.

TABLE 2

| Sensor Location | Position 1 | Position 2 | Position 3 | Position 4 | Position 5 |
|---|---|---|---|---|---|
| Base Right | Aortic Stenosis | Aortic Stenosis | Venous Hum | Venous Hum | Venous Hum |
| Base Left | Split S2 | Systolic Fixed S2 | Systolic Fixed S2 | Pulmonic Stenosis | Pulmonic Stenosis |
| LLSB | Pulmonary Stenosis | Pulmonary Stenosis | Split S1 | Split S1 | Split S1 |
| Apex | 1 Year Heart | 6 Year Heart | Stills Murmur | Split S1 | Mitra Valve Regurg. |
| Trachea | Normal Infant | Normal Child | Stridor Sounds | Stridor Sounds | Stridor Sounds |
| Upper Anterior | Wheezing Sounds | Wheezing Sounds | Wheezing Sounds | Wheezing Sounds | Wheezing Sounds |
| Lower Anterior Posterior | Wheezing Sounds Ronchi Crackles | Wheezing Sounds Ronchi Crackles | Wheezing Sounds Ronchi Crackles | Wheezing Sounds Ronchi Crackles | Wheezing Sounds Ronchi Crackles |

The stethoscope 12j is a significant improvement because such predetermined body sounds can be pinpointed to exact locations on the simulator 14 by selecting the proximity (via the S/N ratio) required between the acquisition coil 376 and the sensor 30j, thus better testing a user's patient care skills. Only one body sound is heard by the user at a time, and then only in the correct anatomical area for locating the sound.

In the preferred embodiment, the sound at a particular sensor location is either heard or not heard, based on a threshold proximity, as explained above. However, in an alternative embodiment, the S/N ratio could be adjusted to overlap for signals from two sensors 30j (and corresponding sounds), allowing the sound to get clearer as the user moved the stethoscope bell 356 closer to one sensor and away from the other sensor to simulate a real life scenario. Referring to FIGS. 1a and 4b, another advantage of the system 10, as regards the stethoscope 12j, is that the electronic control box 358, which is understood to be an appropriately developed CIM 16, is physically integrated into the virtual instrument 12j, thus simplifying the system.

In another embodiment, the virtual stethoscope 12j is appropriately developed to play Korotkoff sounds, and operably connected to a CIM 16 attached to a standard blood pressure cuff or the BP cuff 12d, a manikin arm (not depicted) equipped with a sensor 30j, and air pressure measuring means. The BP cuff 12d is placed around the arm, and it is understood that all the elements are connected to the CIM 16 (tutorial software or an electronic control box). A first user preselects a pulse rate, ausculation gap (optional), systolic blood pressure, and diastolic blood pressure for the arm. When a second user places the bell 356 of the stethoscope within a predetermined proximity of the sensor 30j, a brachial pulse is heard at the preselected pulse rate. The second user then increases the pressure in the BP cuff 12d to a level judged to be above the systolic pressure. If correct, the heartbeats cease, providing audio feedback to the second user, as well as to others if the external speaker is being used. Then, as the second user reduces pressure in the BP cuff 12d, the first Korotkoff sound (K1), representing the systolic pressure, will be heard in synchrony with the selected pulse rate. As pressure is further reduced, sounds including the second, third, and fourth Korotkoff sounds (K2, K3, and K4) will be heard, followed by silence upon reaching the diastolic pressure. The second user records his estimate of the systolic and diastolic pressures, which can be compared to the preselected values. If an ausculation gap has been selected, the second user may have estimated the systolic pressure far below the preselected value, thus "misdiagnosing" a case of hypertension, and gaining valuable experience for future patient care activities.

Figure 5:
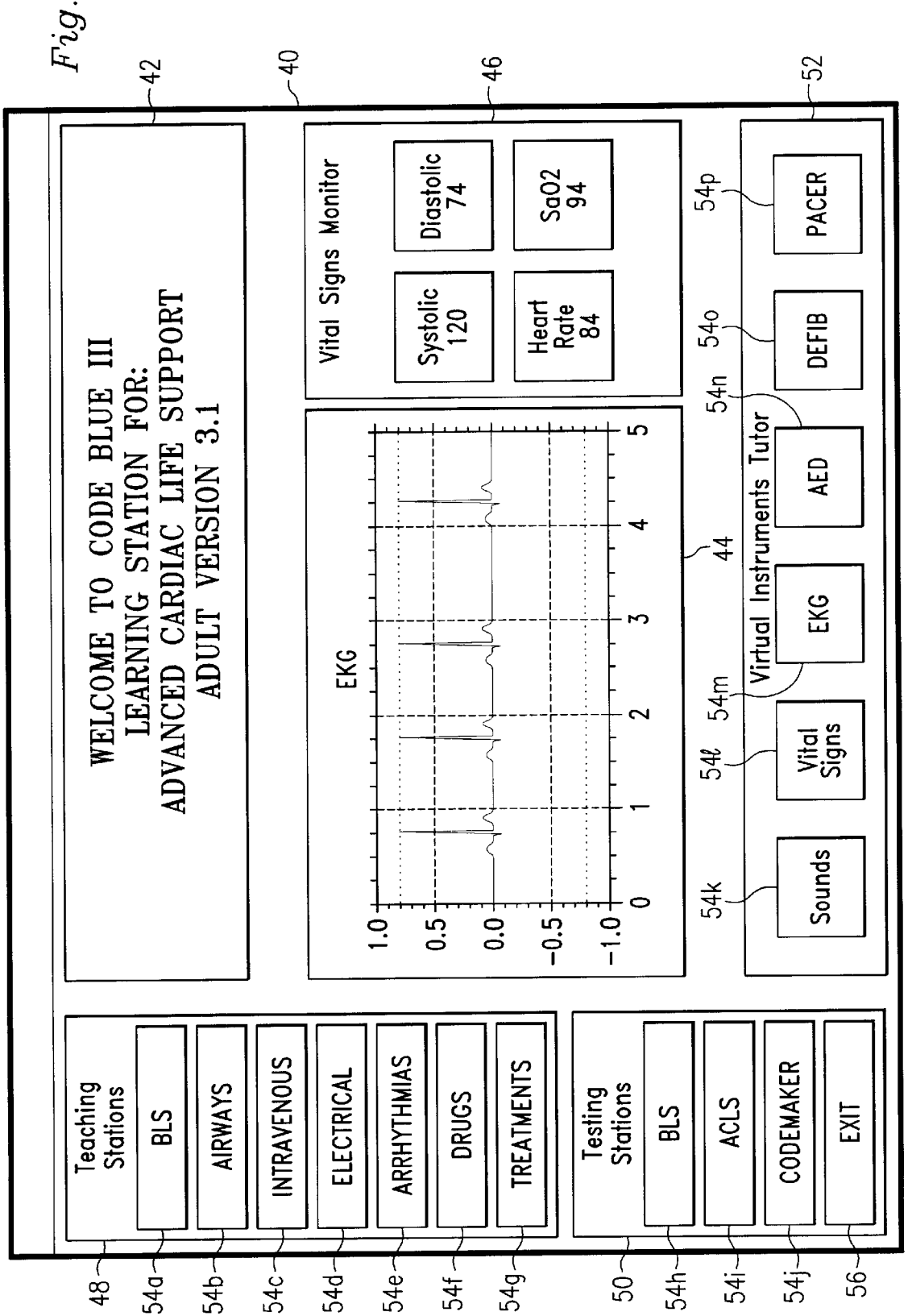

Referring now to FIG. 5, an introductory screen display 40 of the program 15a is presented on the computer 15. The display 40 includes several decorative features: a title box 42, an ECG box 44, and a vital signs box 46. The display 40 also contains a teaching box 48, a testing box 50, and a virtual instruments box 52.

The screen 40 also displays a group of selectable patient care modules 54a–54p provided by the program 15a, which furnish information on medical topics and associated concepts. As will be described, each module has a single topic, and represents an interactive patient care training session for the user. The modules 54a–g are disposed in the teaching box 48, the modules 54h–j are disposed in the testing box 50, and the modules 54k–p are disposed in the virtual instruments tutor box 52. An exit box 56 for exiting the program 15a is also disposed in the testing box 50.

Referring to FIGS. 5 and 6, if one of the modules is selected by the user, such as by voice recognition or selection with a mouse of the computer 15, the program 15a displays a menu screen, listing information categories specific to the topic of the selected module. For example, if the BLS module 54a is selected by a user, the program 15a displays an instruction screen 60, as shown in FIG. 6. The instruction screen 60 contains an information box 62, which contains information regarding a menu bar 64 of the Basic Life Support information items 66–74 of module 54a. It is understood that an item, such as items 66–74 of the BLS module 54a, may be selected from the screen 60 via the menu bar 64, and that each module 54a–p has its own instruction screen with its own menu of specific informational items, as will be described.

Figure 7:
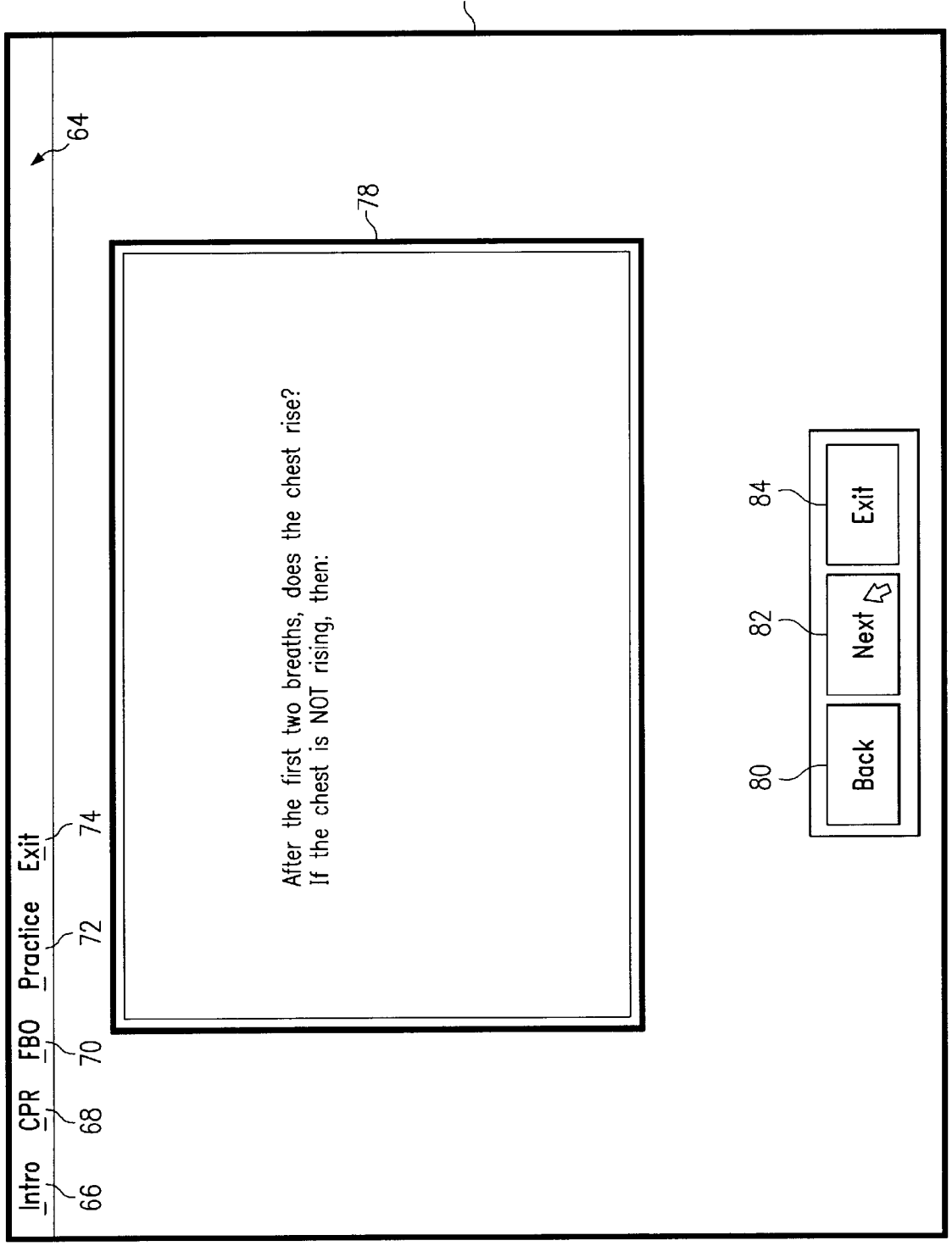

Referring to FIG. 7, selection of an item from a menu, other than an exit item, causes an information display screen 76 to be displayed. The screen 76 has an information box 78, which may contain text and/or illustrations topical to the selected menu item. It is understood that the information screen 76 is used as an example of any number of screens, and furthermore, such screens can be displayed in sequential order, or a series, for each item.

A series of screens, such as screen 76, comprises a tutorial regarding patient treatment protocols for the selected menu item. Thus, the user can review information from a library of topics by selecting the appropriate module from the teaching box 48, and navigating through a series. Navigation in a series of screens is attained by the user's selection between three boxes: 80, 82, and 84, comprising "Back", "Next", and "Exit", respectively, with corresponding function among the screens, such as proceeding backwards or forwards in the series. If no "Back" or "Next" function is possible, as respectively would be the case of the first and last screen of a series, the boxes 80 or 82 may be unselectable. The display screen 76 also has a menu, in this example the pull down menu 64 corresponding to the module 54a, and thus the user may switch between items within the selected module at any point during a series by using the menu bar.

Figure 8:
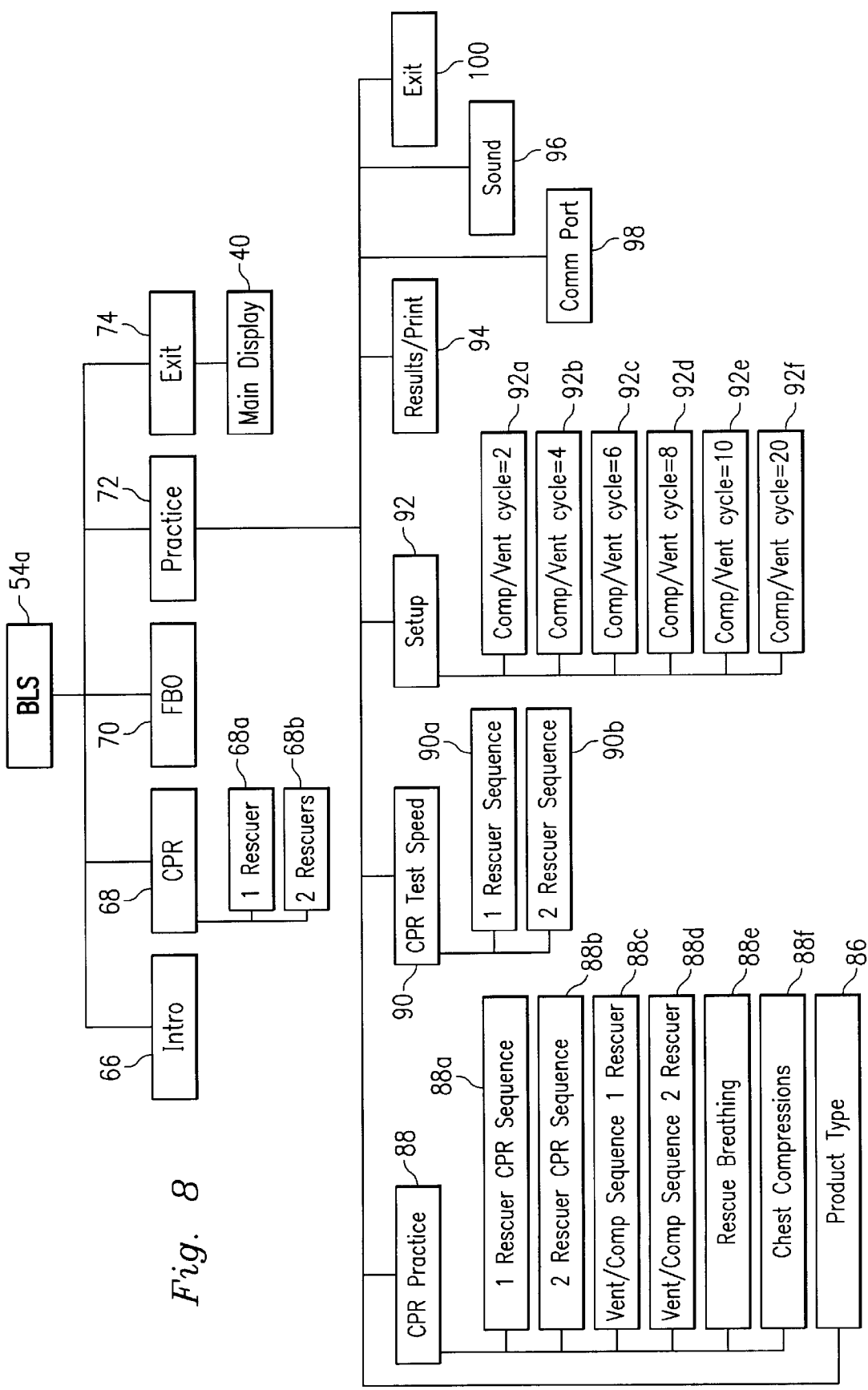

Referring to FIG. 8, the module 54a contains a group of items relating to Basic Life Support: an Intro item 66, a CPR item 68, an FBO (foreign body obstruction) item 70, a Practice item 72, and an Exit item 74 for returning to the display screen 40. Selection of an item begins a series of information display screens (FIG. 7) with appropriate information being supplied by the program 15a, or an item may also be divided into sub-items before the series begins, for example, if the CPR item 68 is selected, the user must select between a set of sub-items 68a and 68b, for one person and two person CPR, respectively.

If the Practice item 72 is selected, the user may practice CPR on the simulator 14 (FIG. 1a), and the program 15a senses the user's compression and ventilation, via the CIM 16 (FIG. 1a) and sensors 30 (FIG. 1a). The heart and lungs of the simulator 14 are connected to pressure transducers confirming airway ventilation and cardiac compression; for example, an air line may be mounted in tracheal wall of the simulator 14 and connected to a sensor 30 connected to the CIM 16, so that when CPR ventilation is performed on the simulator, the CIM 16 monitors the timing and magnitude of the pressure and volume of the ventilation activity, via the air line and the sensor. Similarly, a compression bladder may be embedded within the chest cavity of the simulator 14 for sensing and confirming proper timing and magnitude of a CPR chest compression procedure, when connected by an air line to a compression sensor 30 attached to the CIM 16. The program 15a compares the information pertaining to the user's activity with predetermined standards, and thus provides an interactive training session.

The predetermined standards are selectable, and reflect medical protocols used around the world, including BLS and ACLS guidelines set forth by the American Heart Association and others. At least seven major protocols for cardiopulmonary resuscitation (CPR) are stored and selectable by the user.

Moreover, a user may update the protocols, or enter and store a "New Protocol" reflecting the local protocol regarding depth, duration, and frequency of cardiac compressions and airway ventilations. The program will use this series of acceptable limits to generate a new CPR waveform for testing CPR.

The Practice 72 item contains a group of sub-items 86–100 displayed by the program 15a, as shown. The Product Type sub-item 86 is provided for specifying the type of simulator 14. Upon selection of the CPR Practice sub-item 88, the user may select among a plurality of action sequences 88a–f, to receive training in CPR with one rescuer, CPR with two rescuers, CPR ventilation and compression techniques with one rescuer, or with two rescuers, rescue breathing, or chest compression, respectively. The CPR test speed sub-item 90 prompts the user to select between action sequences 90a or 90b for either one or two rescuers, respectively. The Setup sub-item 92 enables the user to specify that the action sequences comprise 2, 4, 6, 8, 10, or 20 compression/ventilation cycles, respectively 92a–f. The Results/Print sub-item 94 directs the program 15a to record the time and magnitude of the compression and ventilation activity executed by the user on the simulator 14. The Sound sub-item 96 comprises a group of choices (not depicted) for CIM beeps, realistic sounds, or no sound. The Comm port sub-item 98 allows selection between a group of choices (not depicted) for serial port 1 and serial port 2. Selection of the Exit sub-item 100 directs the program 15a to exit from the Practice item 72, and return to the module 54a.

Figure 9:
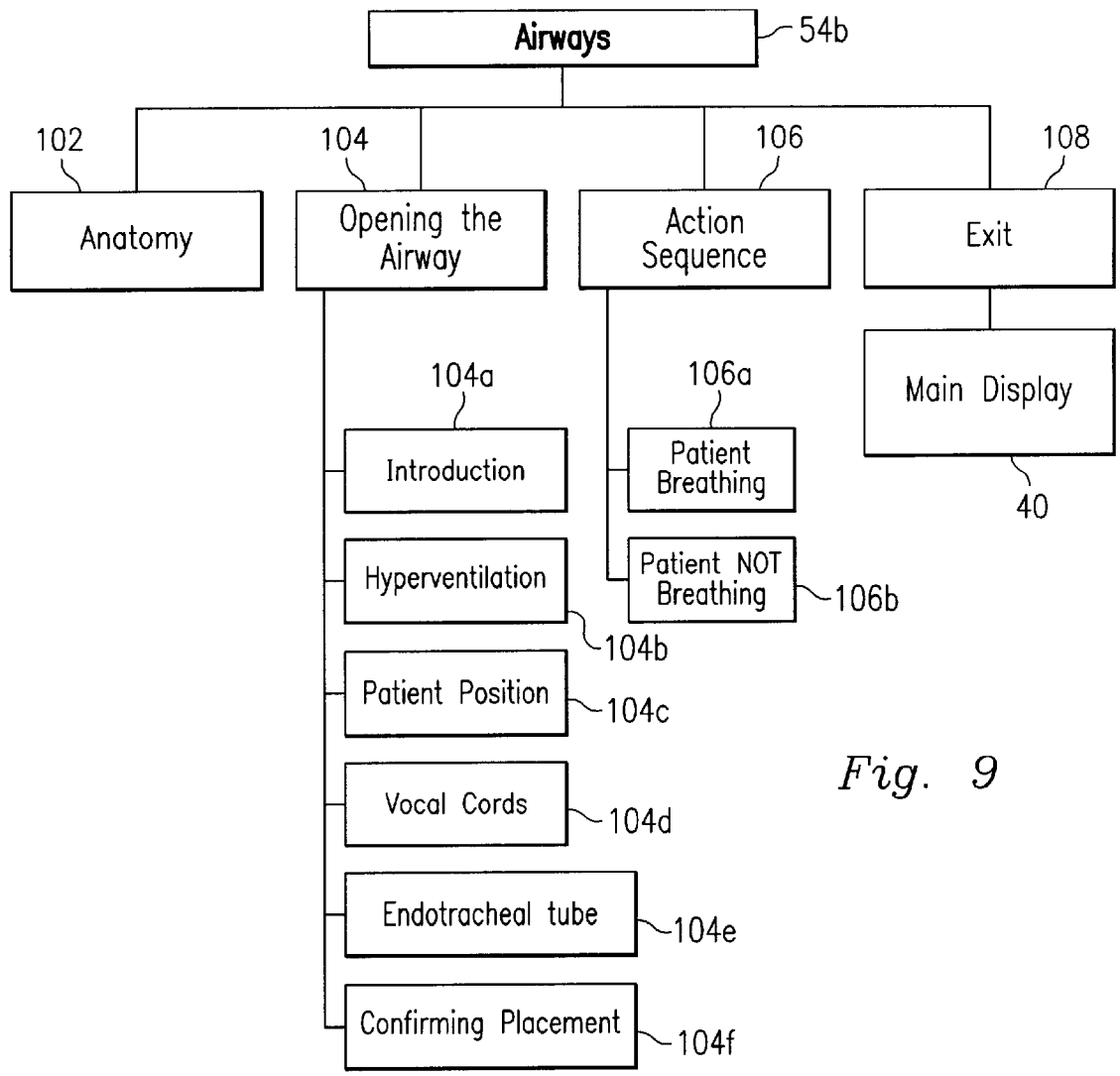

Referring to FIG. 9, selection of the Airways module 54b (FIG. 5) directs execution of the program 15a to provide information items 102–108 directed to Anatomy, Opening the Airway, Action Sequence, and Exit, respectively. The Anatomy item 102 can be selected to display a series of informational screens pertaining to airway anatomy, including the upper torso, neck, head, mouth, and vocal cords. The Opening the Airway item 104 includes sub-items 104a–f regarding introduction, hyperventilation, patient position, vocal cords, endotracheal tube, and confirming placement, respectively. The Action Sequence item 106 includes sub-items 106a and 106b regarding situations where the patient is breathing, and where the patient is not breathing, respectively. The Exit item 108 is selected to exit the Airways module 54b and return to the display 40 (FIG. 5).

Figure 10:
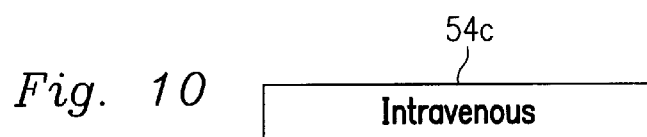

Referring to FIG. 10, selection of the Intravenous module 54c (FIG. 5) directs execution of the program 15a to a provide information items 110–118 directed to Introduction, Peripheral, Endotracheal, Central, and Exit, respectively. The Peripheral item 112 can be selected to display a series of informational screens pertaining to peripheral sites such as the antecubital vein, external jugular vein, saphenous vein, and intraosseous access. The Endotracheal item 114 can be selected to display a series of informational screens pertaining to the administration of atropine, lidocaine, epinephrine (ALE) drugs in an ET tube. The Central item 116 can be selected to display a series of informational screens pertaining to central sites including the femoral vein, subclavian vein, and internal jugular vein. The Exit item 118 is selected to direct the program to exit the Intravenous module 54c and return to the display 40 (FIG. 5).

Figure 11:
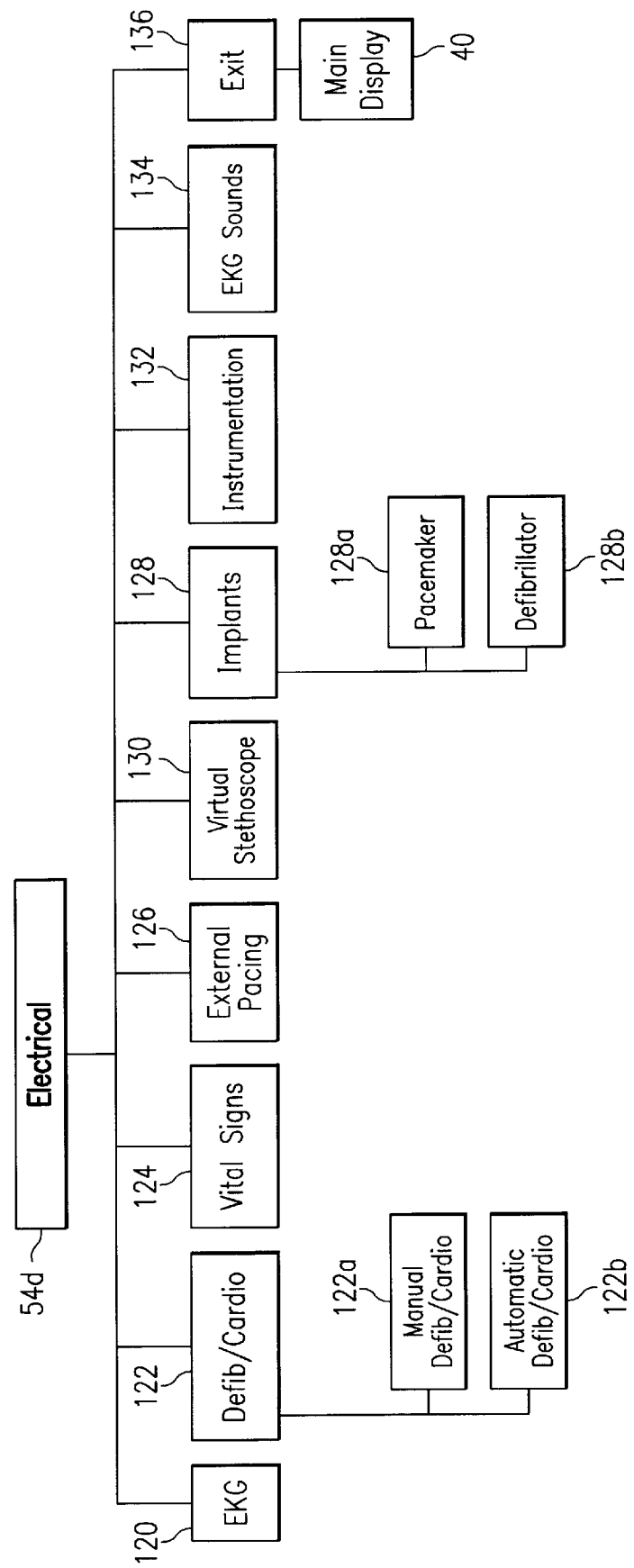

Referring to FIG. 11, selection of the Electrical module 54d (FIG. 5) directs execution of the program 15a to provide information items 120–136 for ECG, Defib/Cardio, Vital Signs, Ext. Pacing, Implants, Virtual Stethoscope, Instrumentation, ECG Sounds, and Exit, respectively. The ECG item 120 can be selected to display a series of informational screens pertaining to theory, use, and virtual ECG. The Defib/Cardio item 122 includes sub-items for manual defibrillation 122a and automatic defibrillation 122b ("AED"). The Vital signs item 124 can be selected to display a series of informational screens pertaining to blood pressure, heart rate, and oxygen saturation. The External Pacing item 126 can be selected to display a series of informational screens pertaining to theory, use, virtual defibrillation, and a virtual pacer. The Implants item 128 has sub-items for a pacemaker 128a and a defibrillator 128b. The Virtual stethoscope item 130 can be selected to display a series of informational screens pertaining to using the software-generated stethoscope, which will be described in greater detail below at FIG. 18, of the program 15a with respect to the virtual instruments tutor box 52. The Instrumentation item 132 has a set of choices (not depicted) for enabling, disabling, or checking the connections between the virtual instruments 12, the sensors 30, and the CIM 16. The ECG Sounds item 134 has set of choices (not depicted) for enabling or disabling the sounds. Exit item 136 is selected to direct the program 15a to exit from the Electrical module 54d, and return to the display 40 (FIG. 5).

Figure 12:
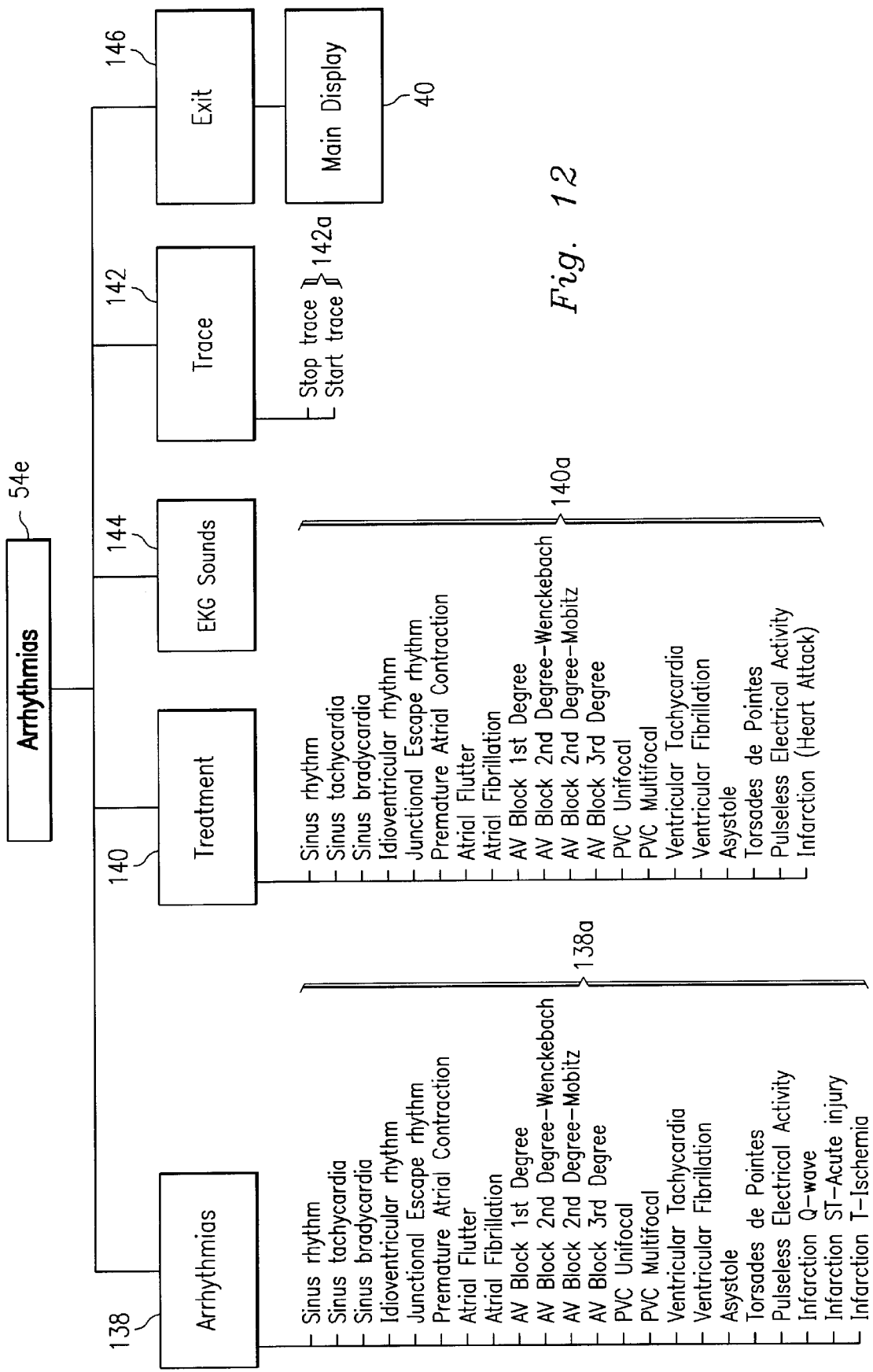

Referring to FIG. 12, selection of the Arrhythmias module 54e (FIG. 5) directs execution of the program 15a to a provide information regarding Arrhythmias, Treatment, Trace, and Exit, respectively items 138–146. The items 138 and 140 include a group of choices for information about a number of problems and treatments, respectively 138a and 140a. The Trace item 142 has controls for starting and stopping the trace, collectively 142a. The ECG Sounds item 144 has set of choices (not depicted) for enabling or disabling the sounds. Selection of the Exit item 146 directs the program 15a to exit from the Arrhythmias module 54e, and return to the display 40 (FIG. 5).

Figure 13:
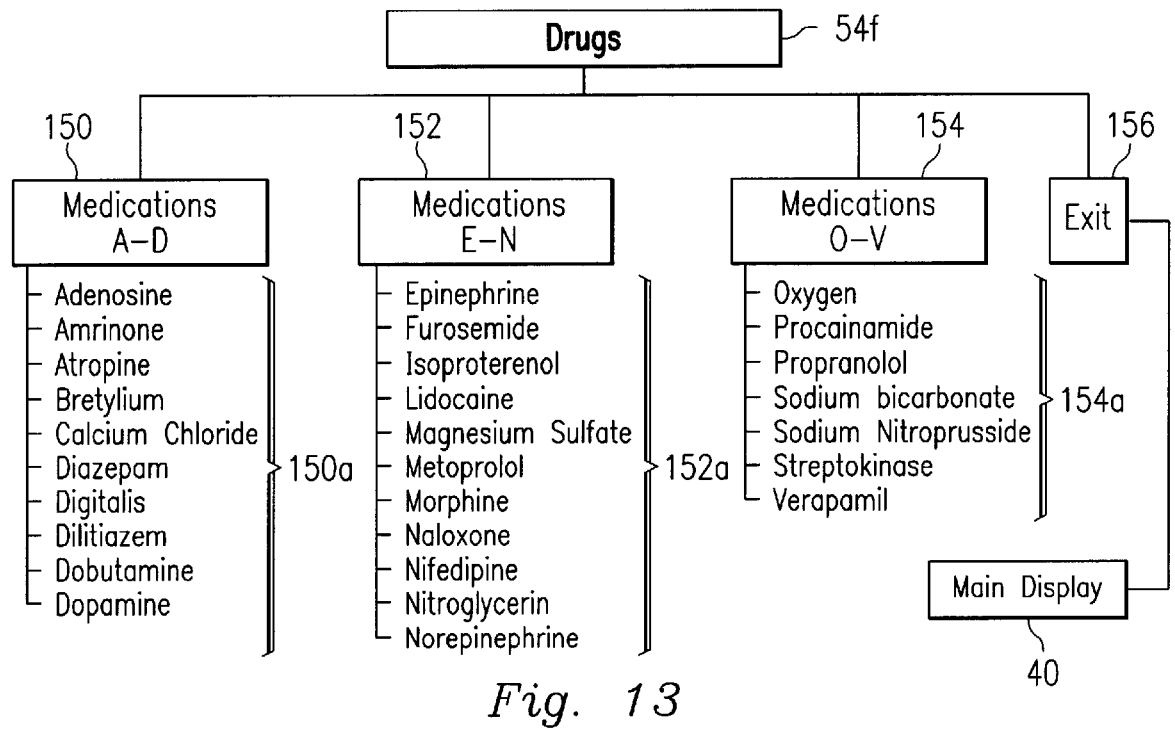

Referring to FIG. 13, selection of the Drugs module 54f (FIG. 5) directs execution of the program 15a to provide information regarding drugs, divided alphabetically into items 150–154, respectively Medications A-D, E-N, and O-V. These items include a group of choices 150a–154a for information including the dosage, indications, uses, actions, side effects, and precautions for the alphabetically grouped drugs. Selection of the Exit item 156 directs the program 15a to exit from the Drugs module 54f, and return to the display 40 (FIG. 5).

Figure 14:
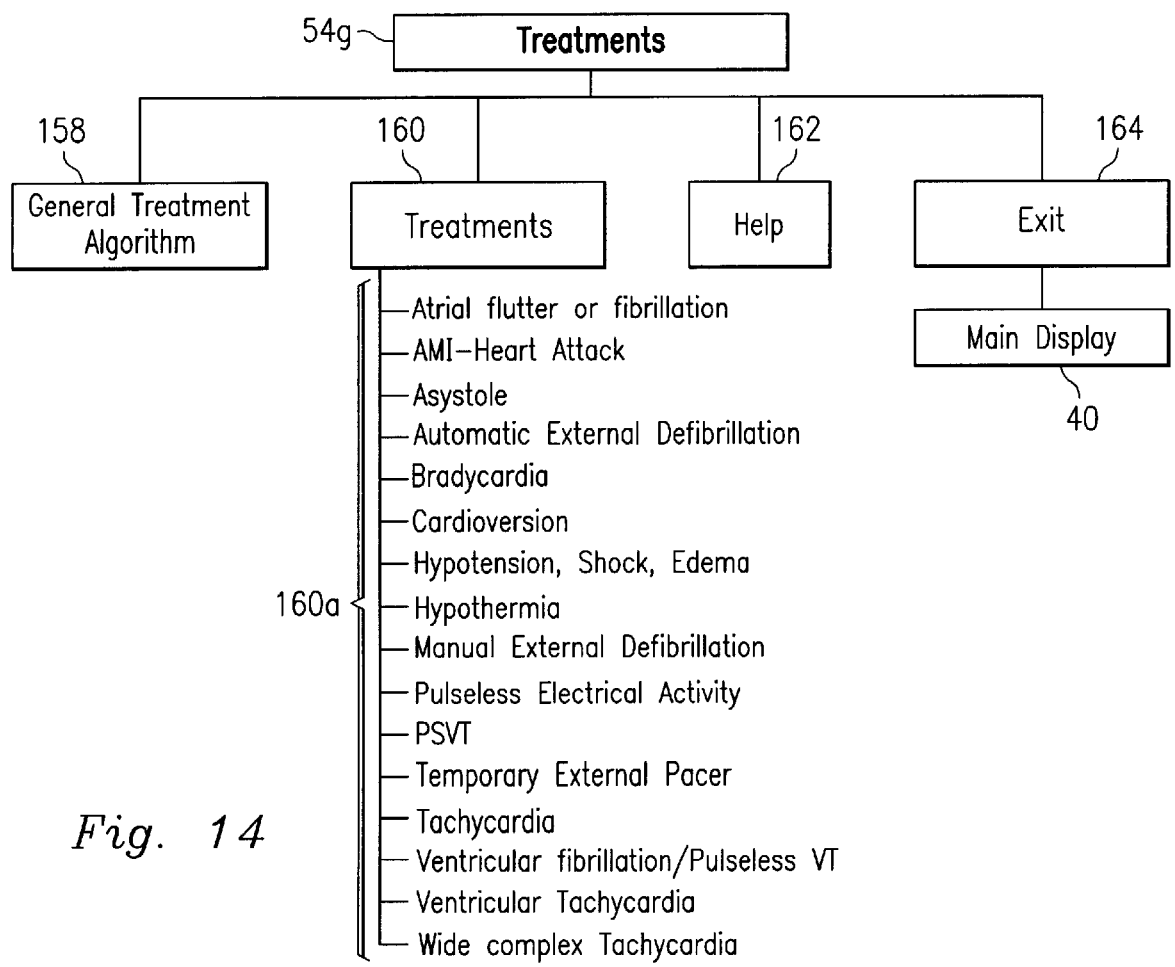

Referring to FIG. 14, selection of the Treatments module 54g (FIG. 5) directs execution of the program 15a to provide informational algorithms regarding treatment action sequences, including the items General Algorithm 158, Treatments 160, Help 162, and Exit 164. The General Algorithm 158 allows the user to work through a treatment scenario by answering questions as to a program-simulated patient's status. The Treatments item 160 includes a group of choices 160a to receive information on topics including atrial flutter, AMI heart attack, asystole, automatic external defibrillation, bradycardia, cardioversion, shock, hypothermia, manual external defibrillation, pulseless electrical activity, PSVT, temporary external pacer, tachycardia, ventricular fibrillation, ventricular tachycardia, and wide complex tachycardia. The Help item 162 provides information regarding using the Treatments module 54g. Selection of the Exit item 164 directs the program 15a to exit from the Treatments module 54g, and return to the display 40 (FIG. 5).

Referring back to FIG. 5, selection of a test module 54h–j from the test box 50 directs execution of the program 15a to provide a testing sequence to help test the user on patient care protocols, such as CPR and other responses to Code scenarios. The program 15a paces through the steps of a patient distress scenario, giving the user a predetermined time to respond or complete the task required, thus enabling the user to experience the pressure of a Code situation. For example, the program 15a may test the user by presenting choices from which the user must select in order to treat the patient, wherein the user must complete the correct choice before the sequence proceeds to the next event. The program 15a enables the user to enable, disable, or check the virtual instruments 12 and sensors 30 for connection to supply input to the CIM 16.

If the virtual instruments 12 (FIGS. 1a and 2) are enabled, the user may implement patient care activity on the simulator 14 using the virtual instruments 12, with the results and quality of response being monitored by the program 15a. Alternatively, the user may use software-simulated instruments 12' (FIG. 1b) generated by the program 15a. The program 15a advances through the scenario until the patient recovers, and provides a running critique of the user's responses, with an explanation of each incorrect choice or action. Features of the test modules 54h–j include items that enable the user to specify that action sequences prescribed by the scenario comprise a predetermined number of compression/ventilation cycles on the simulator 14, or to allow the user to record the time and magnitude of the compression and ventilation activity performed on the simulator 14, or to select among a group of choices for hearing realistic sounds.

Figure 15:
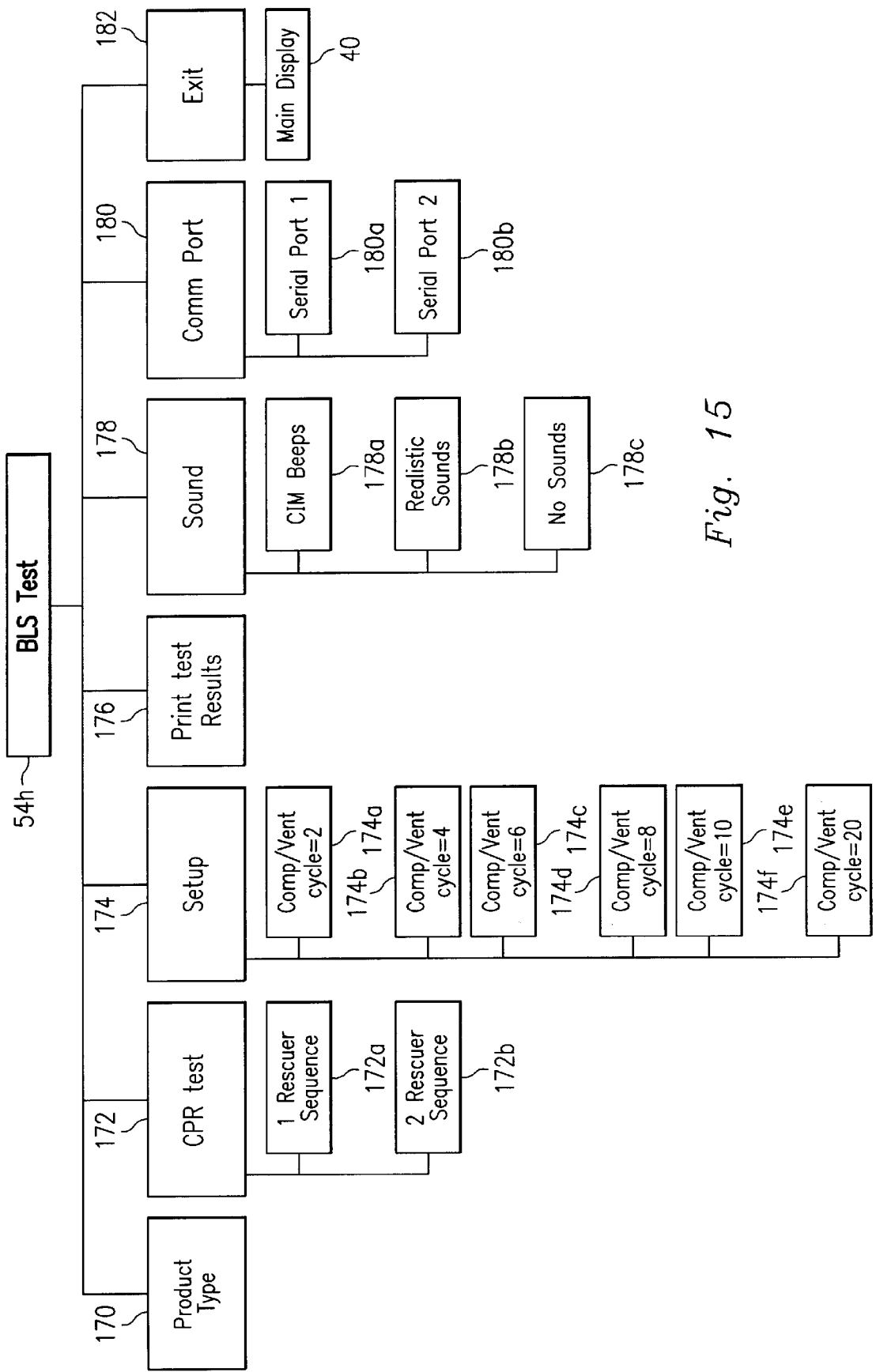

Referring to FIG. 15, selection of the BLS Test module 54h (FIG. 5) directs execution of the program 15a to provide items 170–182, respectively, Product type, CPR Test, Setup, Print, Sound, and Comm port, to help test the user on CPR techniques. The Product type item 170 is provided for specifying the type of simulator 14. Upon selection of the CPR test item 172, the user may select among a plurality of action sequences, to receive training in CPR with one rescuer 172a, or with two rescuers 172b. The Setup item 174 enables the user to specify that the action sequence comprises 2, 4, 6, 8, 10, or 20 compression/ventilation cycles, respectively 174a–f. The Print item 176 directs the program 15a to record the time and magnitude of the compression and ventilation activity executed by the user on the simulator 14. The Sound item 178 comprises a group of choices for CIM beeps, realistic sounds, or no sound, respectively 178a–c. The Comm port item 180 allows selection between a group of choices for serial port 1 and serial port 2, respectively 180a–b. Selection of the Exit item 182 directs the program 15a to exit from the BLS test module 54h, and return to the display 40 (FIG. 5).

Figure 16:
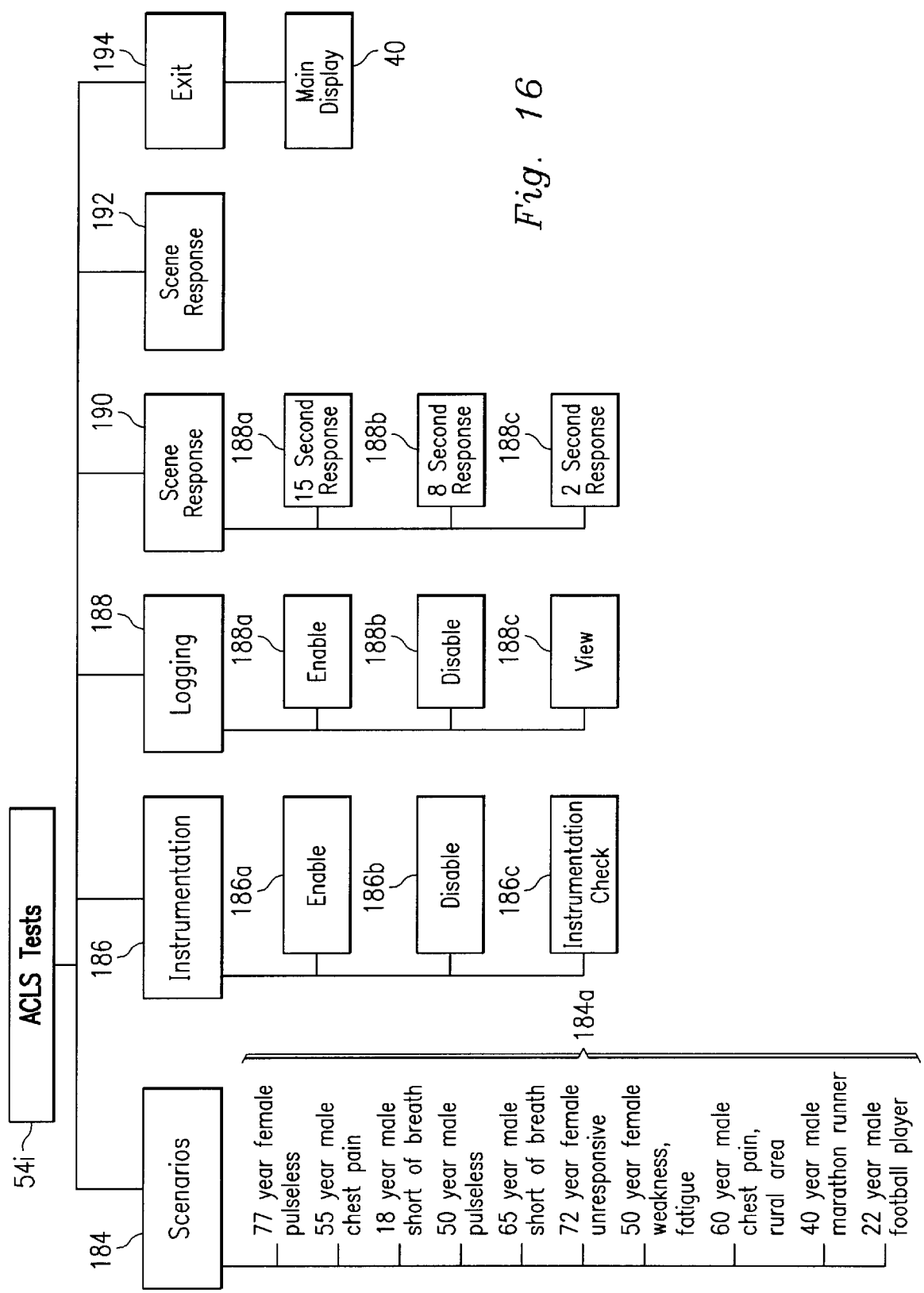

Referring to FIG. 16, selection of the ACLS Test module 54i (FIG. 5) allows the user to select among a plurality of items 184–194, for Scenarios, Instrumentation, Logging, Scene Response, ECG Sounds, and Exit, respectively. The Scenarios item 184 contains a group of action sequences 184a, comprising a pulseless 77 year old female, a 55 year old male with chest pain, an 18 year old male short of breath, a 50 year old pulseless male, a 65 year old male short of breath, a 72 year old unresponsive female, a 50 year old female with weakness and fatigue, a 60 year old male with chest pain in a rural area, a 40 year old male marathon runner, and a 22 year old football player. The user selects from the group 184a and then navigates a series of information screens while responding to queries as to the proper procedure for the selected action sequence. More specifically, the program 15a supplies details of the selected sequence, as well as a box (not depicted) showing the patient's ECG trace and vital signs. The Instrumentation item 186 enables the user to enable 186a, disable 186b, or check for connection 186c, the virtual instruments 12 and sensors 30 that supply input from the simulator 14 to the CIM 16. The user may use software-simulated instruments generated in the module 54i by the program 15a, or, alternatively, if the instrumentation is enabled by selecting sub-item 186a, the user may implement patient care activity on the simulator 14, with the results and quality of response being monitored by the program 15a. The Logging item 188 comprises sub-items 188a–c to enable, disable, or view a record of the time and magnitude of the compression and ventilation activity executed by the user on the simulator 14. The Scene Response item 190 has a group of choices 190a–c for selecting between a two, eight, or fifteen second scene response. The ECG Sounds item 192 has a group of choices (not depicted) for enabling or disabling the sounds. Selection of the Exit item 194 directs the program 15a to exit from the ACLS module 54i, and return to the display 40 (FIG. 5).

Figure 17A:
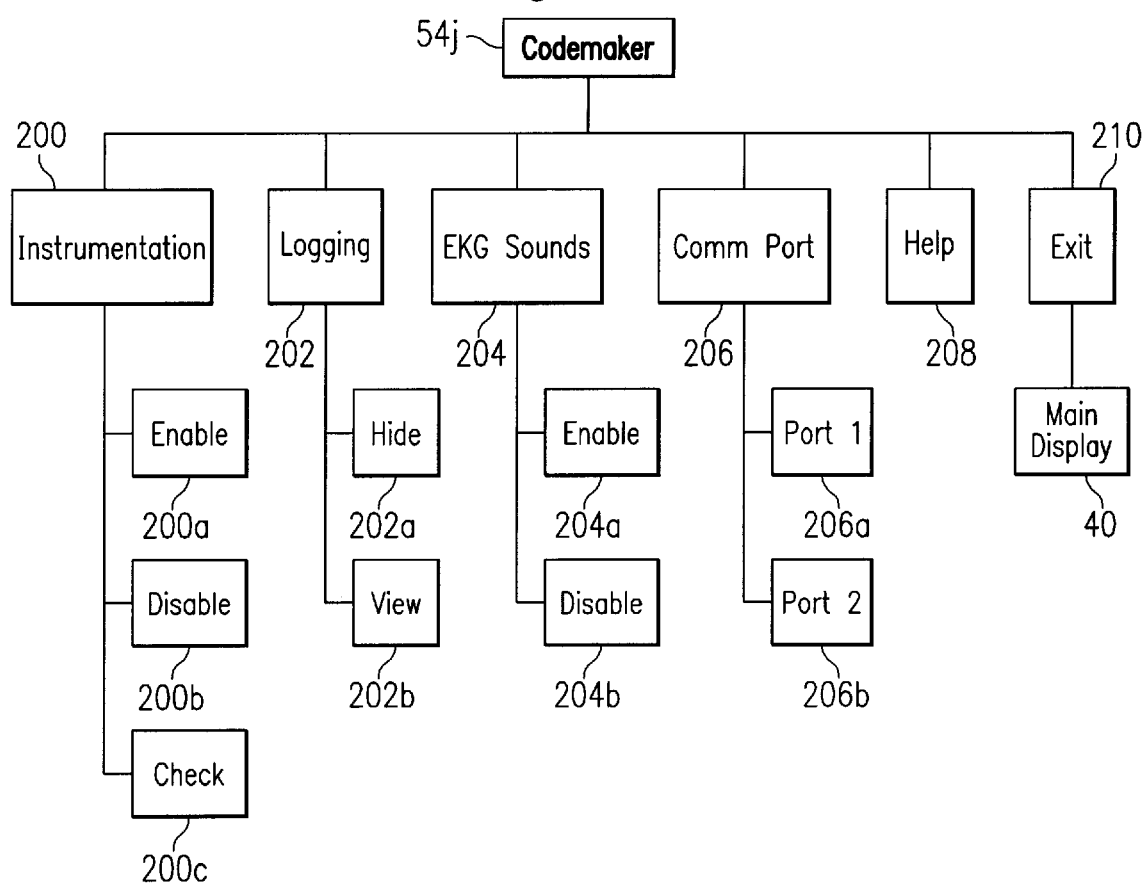
Figure 17C:
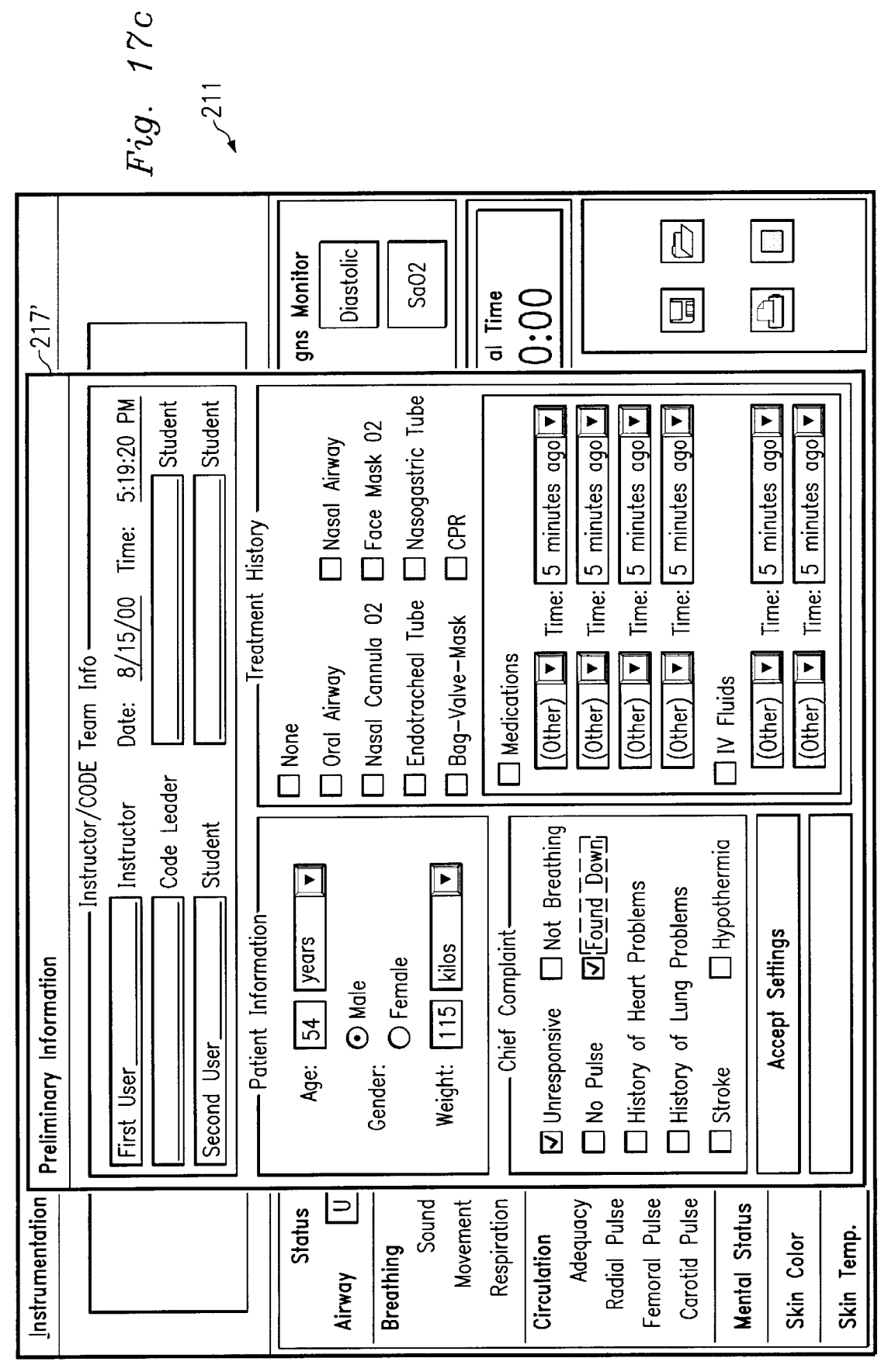

Testing may be defined by the program 15a, as above, or by the user. For example, selection of the Codemaker Test module 54j (FIG. 5) allows a first user, for example, an instructor, to create a scenario to test a second user, for example, a student. Referring to FIG. 17a, the Codemaker test module 54j includes a plurality of items 200–210, for Instrumentation, Logging, ECG Sounds, Comm. Port, Help, and Exit, respectively. The Instrumentation item 200 enables the user, by further selecting from a group of choices 200a–c to enable or disable or check the virtual instruments 12 and sensors 30 that supply input from the simulator 14 to the CIM 16. The Logging item 202 comprises a group of choices 202a–b to hide or view a record of the time and magnitude of the compression and ventilation activity executed by the user on the simulator 14. The record produced by the Logging item 202 can be used to provide feedback to the user.

Alternatively, if the instruments are disabled (item 200b), the student may institute appropriate treatment using software-generated instruments. The ECG Sounds item 204 has a group of choices 204a and 204b for enabling or disabling the sounds. The Comm port item 206 allows selection between a group of choices 206a and 206b for communication ports one and two, respectively. The Help item 208 provides direction for using the module 54j. Selection of the Exit item 210 directs the program 15a to exit from the Codemaker module 54j, and return to the display 40 (FIG. 5).

Referring to FIGS. 17b–17f, views of screen displays generated by the program for the Codemaker module are shown. The screen displays 211 have a menu bar 211a containing navigation items 200–210, for Instrumentation, Logging, ECG Sounds, Comm. Port, Help, and Exit, respectively. The screen displays also have an ECG chart 212, Vital Signs monitor 213, patient status update box 214, total elapsed time clock 215, and a data box 216 with conventional functions to save a session, open files, delete files, or print. A user may select a preliminary information button 217, or may be prompted to prompted to supply such information. Selection of the button 217 creates an internal display screen 217' (FIG. 17c), where the user may input preliminary data.

Figure 17D:
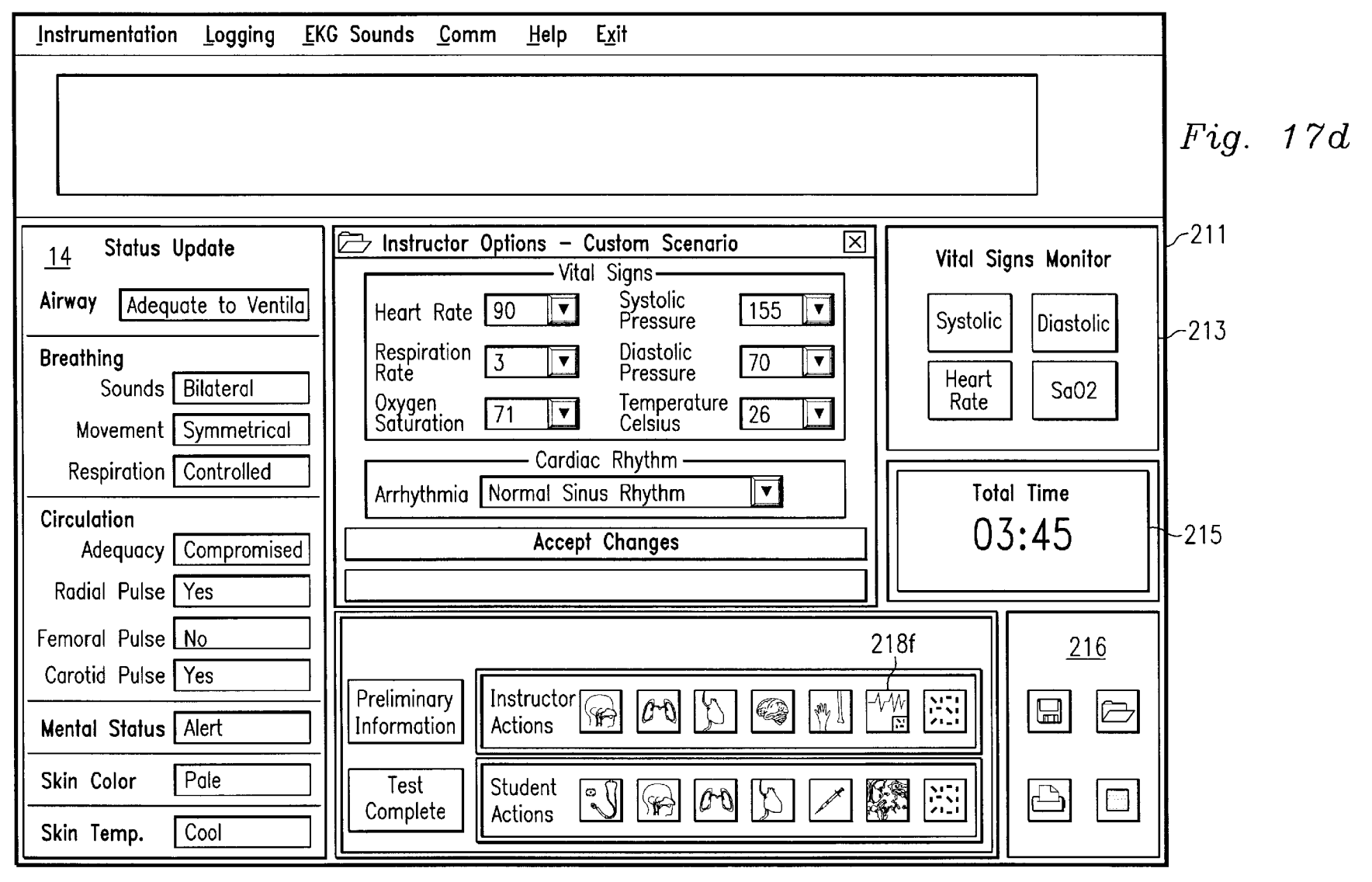
Figure 17F:
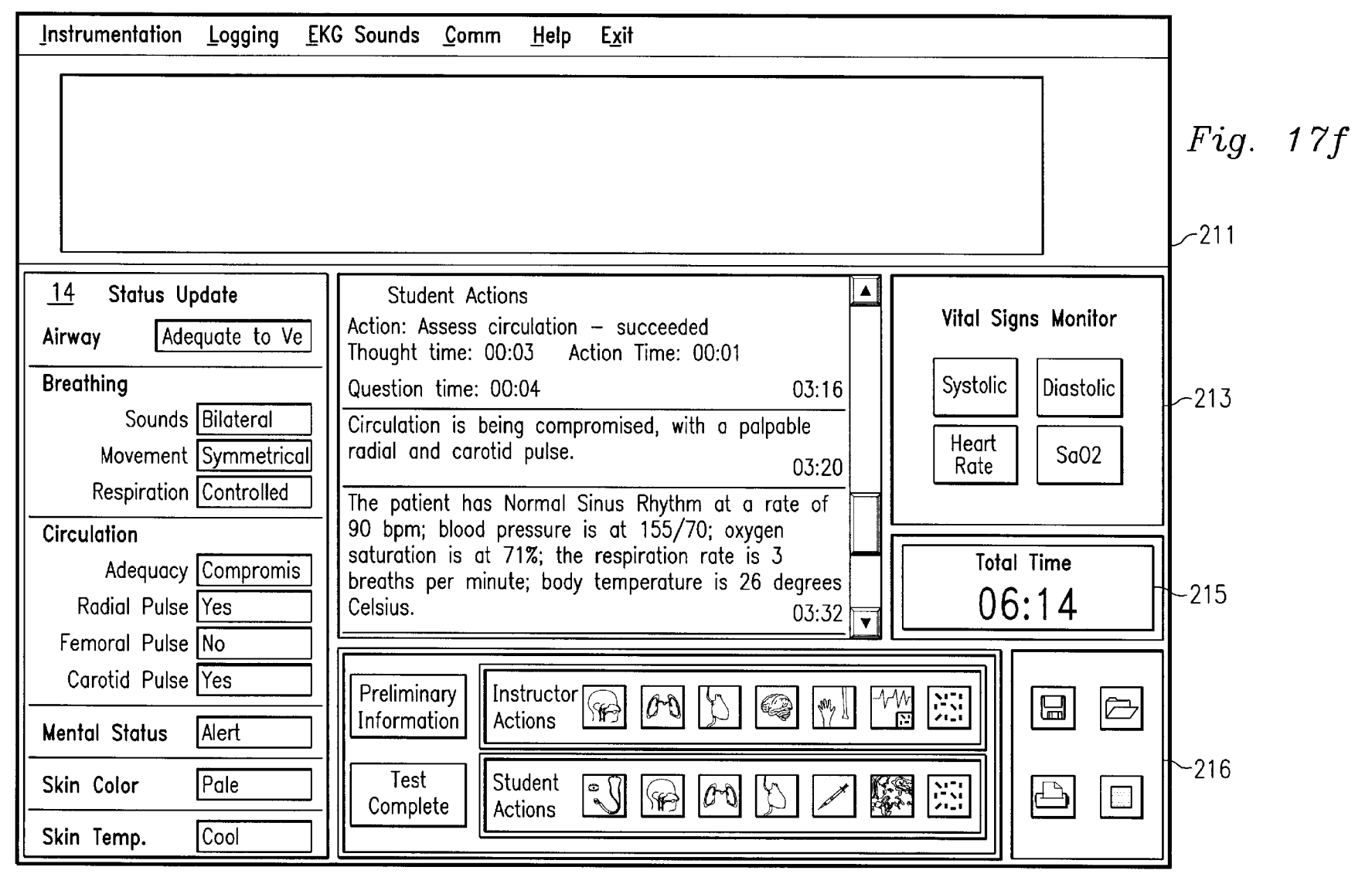

An Action box 218 retains buttons 218a–g for instructors to further customize conditions. For example, selection of the button 218f creates an internal display screen 218f (FIG. 17d), where the instructor may input vital signs and cardiac rhythms which will be realistically reflected in the vital signs monitor 213. Thus, using buttons 217 and 218a–g, the instructor defines the patient simulator (virtual or tangible) of the testing scenario by entering a set of preliminary patient parameters regarding information such as sex, weight, and age, as well as patient indications, like shortness of breath, chest pain, mental awareness, and circulation. These patient indications are summarized in box 214 (FIG. 17d). An instructor defined testing system allows the instructor to test the student on local, national, or international patient care protocols. Many algorithms are selectable by opening files, including BLS, ACLS, Pediatric, and Obstetric (OB) emergencies. Other algorithms may be created and stored, and algorithms may be linked together as well.

Action may be taken in response to the conditions by the student via buttons 218h–n. For example, selection of the button 218m creates an internal display screen 218m' (FIG. 17e), where the student may select among virtual instruments to use to render patient care activities. The student may then perform the patient care activities virtually, or using the a tangible simulator.

All of the student and instructor actions are noted in the log 219 (FIG. 17f) along with time markers for later review. Action can be paused and resumed.

Benefits of this module include flexibility for instruction and the ability to detect mastery of the subject. An instructor-defined algorithm would presumably vary from well-known, structured algorithms, and thus avoid the problem of rote memorization of responses by the student.

Use of the modules 54*k*–*p* of the virtual instruments tutor box 52 provides information about instruments commonly used in Code scenarios. In some instances, opportunities to practice using some of the virtual instruments 12 in patient care protocols with the simulator 14 are provided.

Figure 18:
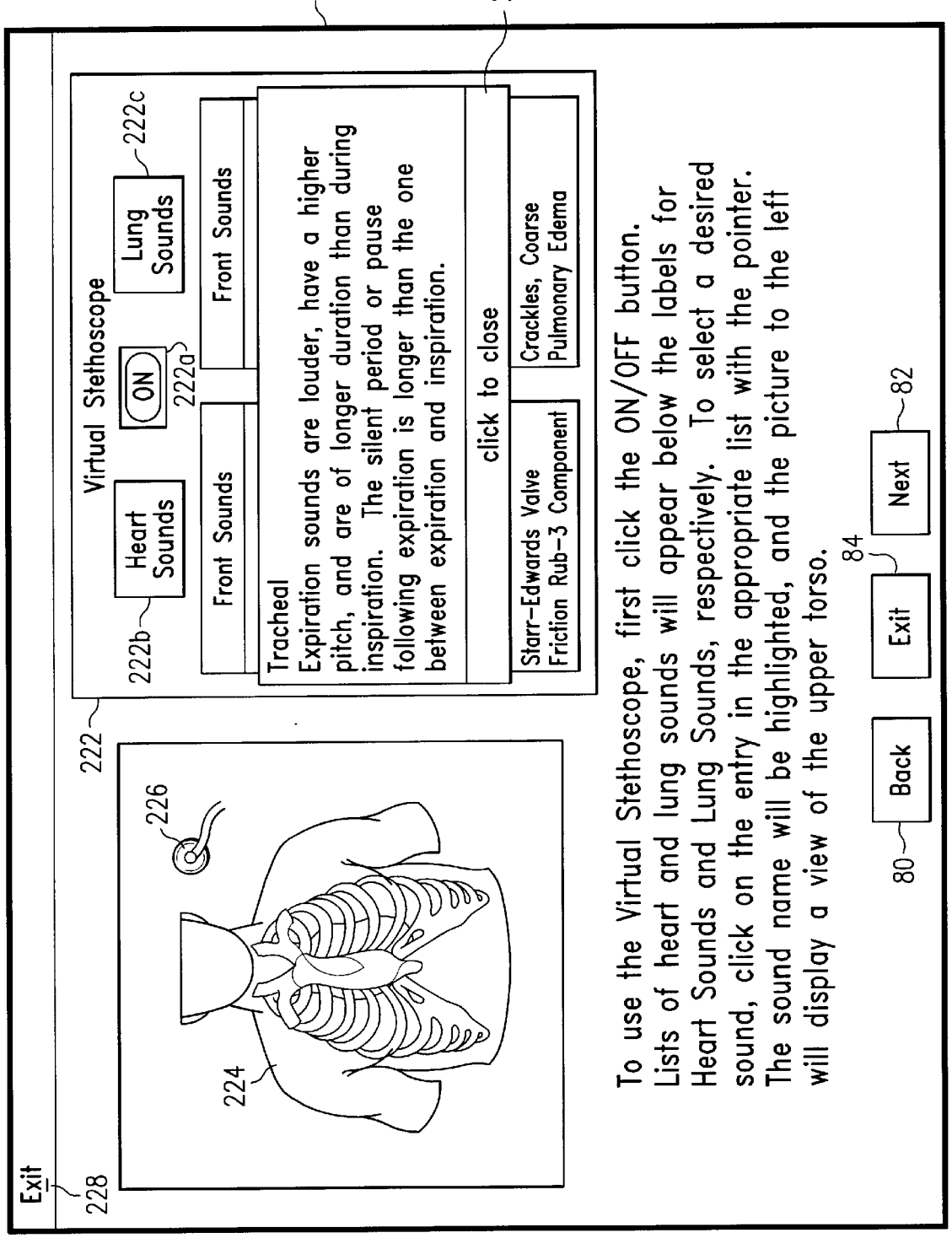
FIG. 18 is a view of a screen display generated by the program relating to the interaction between a software-generated virtual instrument and a software-generated simulator of the system of FIG. 1b.

Referring to FIG. 18, selection of the Sounds module 54*k* (FIG. 5) by the user causes the program 15*a* to display a series of screens, such as display 220. The display 220 includes a Sounds box 222 containing an On/Off button 222*a*, and a list of selectable heart and lung sounds, respectively 222*b* and 222*c*. Selection of a sound from the lists 222*b*–*c* will direct the program 15*a* to display a tutorial box 222*d* with information relating to the selected sound. The display is navigated by the Back, Next, and Exit buttons, respectively 80–84, and additionally contains a representation of a human torso 224 (e.g., 14' of FIG. 1*b*), such that when a stethoscope icon 226 (e.g., 12' of FIG. 1*b*), corresponding to the position of a mouse (not depicted) of the computer 15, is moved around the torso, the stethoscope icon glows when placed in the correct anatomical area for hearing the selected sound and the program 15*a* plays the sound. Thus, the program 15*a* displays both audio and visual feedback for learning the location for detecting selected body sounds in a patient. An Exit item 228 is provided for exiting the module 54*k* and returning to the display 40 (FIG. 5).

Alternatively, the portion of the program 15*a* controlling the sounds and stethoscope icon may be excerpted and saved to a portable data storage device, such as a CD-ROM, to create a learning system for locating selected body sounds in a patient featuring both audio and visual feedback.

Referring to FIG. 19, selection of the Vital Signs module 54*l* (FIG. 5) causes the program 15*a* to display a series of screens, such as display 230. The display 230 includes a Vital signs monitor box 232 containing indicator boxes for systolic pressure, diastolic pressure, heart rate, and oxygen saturation, 232*a*–*d*, respectively. The display 230 is navigated by the Back, Next, and Exit buttons, respectively 80–84. A Sample Rhythms item 234 contains a group of selectable rhythms for the user to observe, such as a normal sinus rhythm, sinus bradycardia, idioventricular rhythm, ventricular tachycardia, and ventricular fibrillation. An Exit item 236 is provided for exiting the module 54*l* and returning to the display 40 (FIG. 5).

Referring to FIG. 20, selection of the Virtual ECG Monitor module 54*m* (FIG. 5) causes the program 15*a* to display a series of screens, such as display 240. The display 240 includes an Electrocardiograph box 242 for displaying the ECG sweep 242*a*, and having a heart rate indicator 242*b* and On/Off button 242*c*. The display 240 is navigated by the Back, Next, and Exit buttons, respectively 80–84. A Sample Rhythms item 244 contains a group of selectable rhythms for the user to observe, such as a normal sinus rhythm, sinus bradycardia, idioventricular rhythm, ventricular tachycardia, and ventricular fibrillation. An ECG Sounds item 246 allows the user to enable or disable the associated sounds. An Exit item 248 is provided for exiting the module 54*m* and returning to the display 40 (FIG. 5).

Referring to FIG. 21, selection of the Automatic Defibrillator module 54*n* (FIG. 5) causes the program 15*a* to display a series of screens, such as display 250. The display 250 includes a Control box 252 having an advisories box 252*a*, and On/Off, Analyze, and Shock buttons 252*b*–*d*. The display 250 also has an ECG box 254 having a sweep 254*a*, and On/Off button 254*b*. The display 250 is navigated by the Back, Next, and Exit buttons, respectively 80–84. A Sample Rhythms item 256 contains a group of selectable rhythms for the user to observe, such as a normal sinus rhythm, sinus bradycardia, idioventricular rhythm, ventricular tachycardia, and ventricular fibrillation. An ECG Sounds item 258 allows the user to enable or disable the associated sounds. An Exit item 259 is provided for exiting the module 54*n* and returning to the display 40 (FIG. 5).

Figure 22:
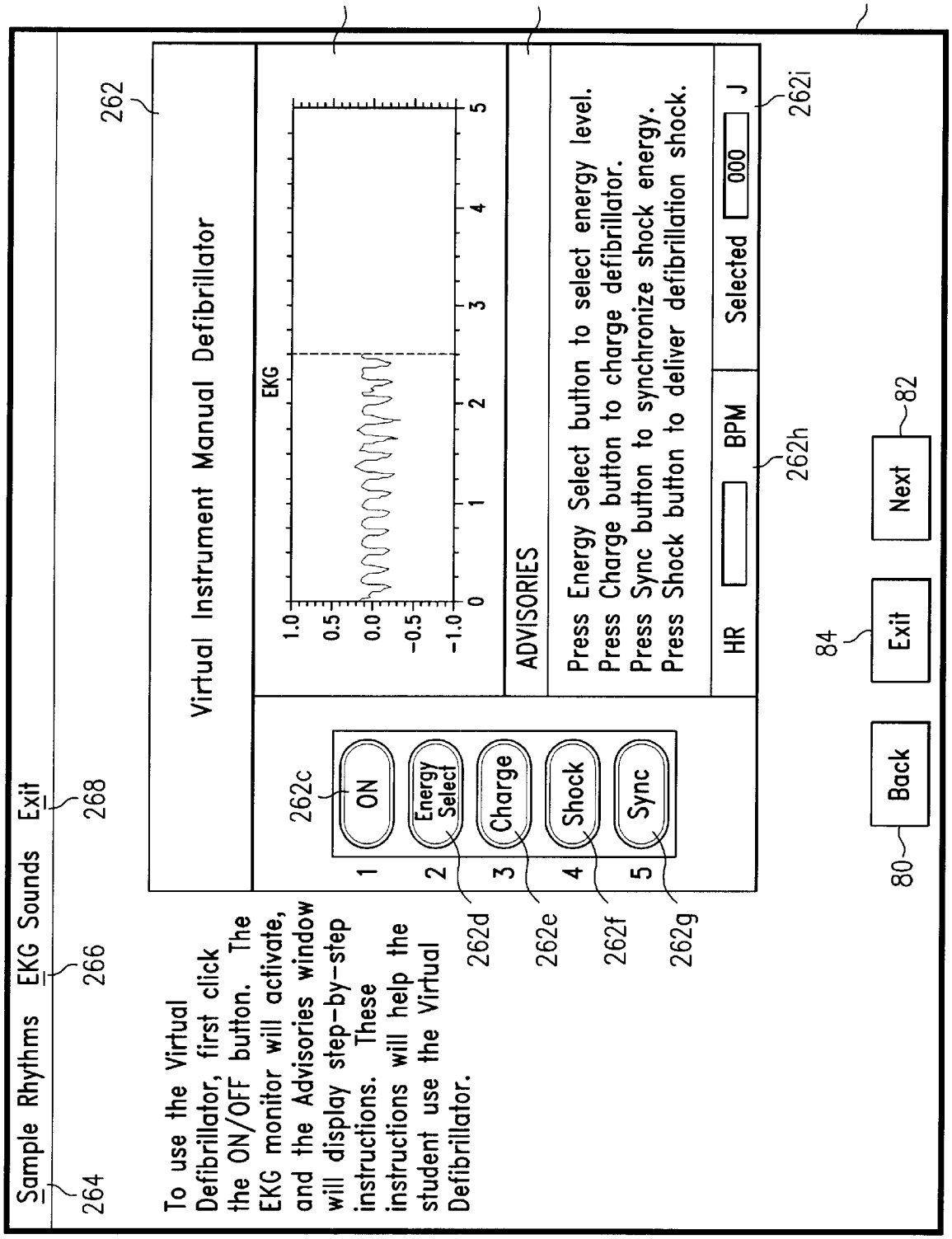

Referring to FIG. 22, selection of the Manual Defibrillator module 54*o* (FIG. 5) causes the program 15*a* to display a series of screens, such as display 260. The display 260 includes a Control box 262, having an imbedded ECG sweep 262*a*, an advisories box 262*b*, buttons 262*c*–*g*, respectively On/Off, Energy Select, Charge, Shock, and Synchronize, as well as a heart rate display 262*h*, and a selected energy indicator 262*i*. The display 260 is navigated by the Back, Next, and Exit buttons, respectively 80–84. A Sample Rhythms item 264 contains a group of selectable rhythms for the user to observe, such as a normal sinus rhythm, sinus bradycardia, idioventricular rhythm, ventricular tachycardia, and ventricular fibrillation. An ECG Sounds item 266 allows the user to enable or disable the associated sounds. An Exit item 268 is provided for exiting the module 54*o* and returning to the display 40 (FIG. 5).

Figure 23:
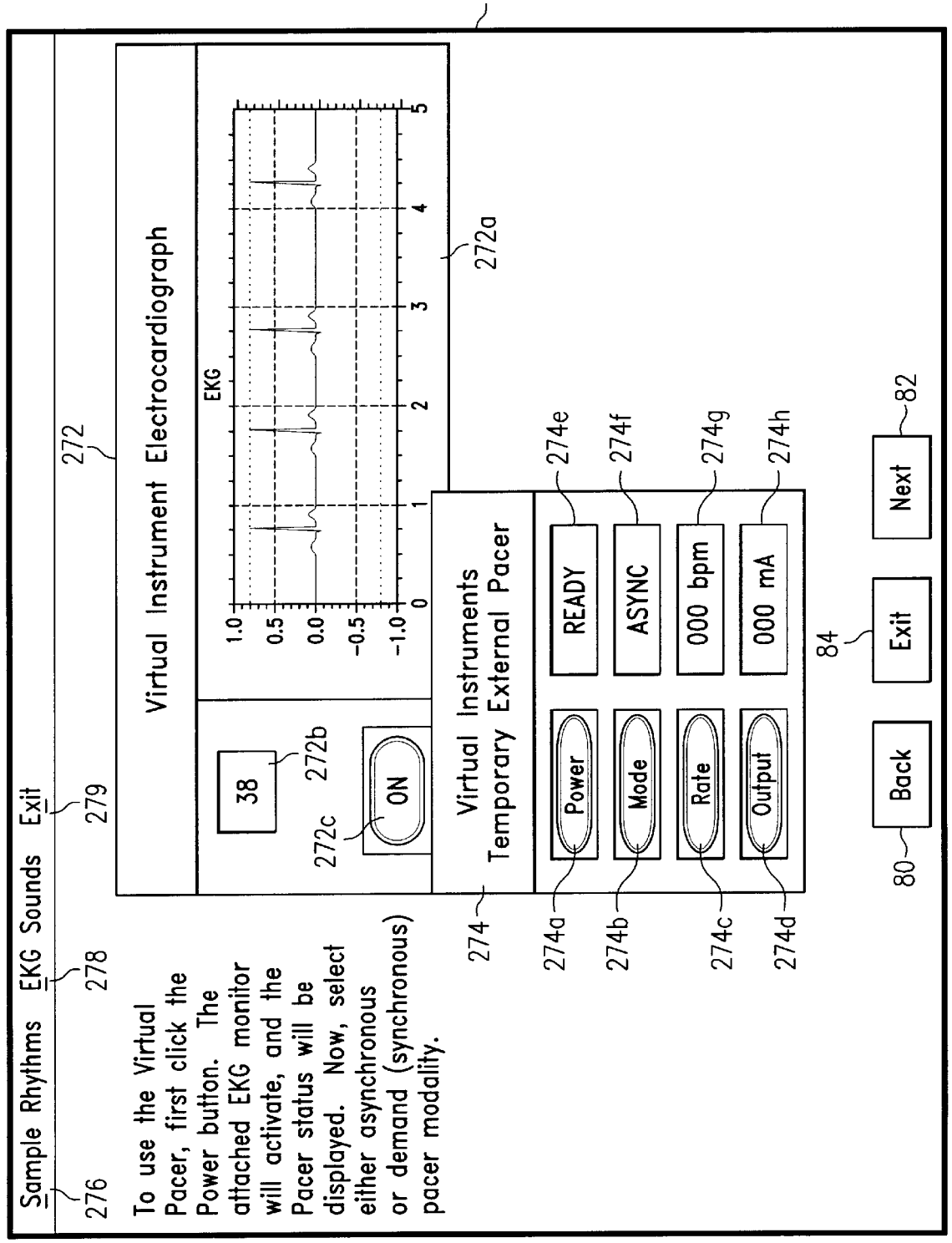

Referring to FIG. 23, selection of the Electrocardiograph module 54*p* (FIG. 5) causes the program 15*a* to display a series of screens, such as display 270. The display 270 includes an ECG box 272, having an associated ECG sweep 272*a*, a heart rate indicator 272*b*, and an On/Off button 272*c*. A Pacer box 274 is also provided by the program 15*a* and has buttons for power, mode, rate, and output, 274*a*–*d*, respectively, having associated status indicators 274*e*–*h*. The display 270 is navigated by the Back, Next, and Exit buttons, respectively 80–84. A Sample Rhythms item 276 contains a group of selectable rhythms for the user to observe, such as sinus bradycardia and idioventricular rhythm. An ECG Sounds item 278 allows the user to enable or disable the associated sounds. An Exit item 279 is provided for exiting the module 54*p* and returning to the display 40 (FIG. 5).

Although illustrative embodiments have been shown and described, a wide range of modifications, changes, and substitutions are contemplated. In some instances, certain features may be employed without a corresponding use of the other features in the foregoing disclosure. Furthermore, it is understood that variations may be made in the foregoing embodiments without departing from the scope of the disclosure. Accordingly, it is appropriate that the appended claims be construed broadly.

What is claimed is:

1. An interactive education system for teaching patient care to a user, the system comprising:

a patient simulator;

a virtual instrument for use with the patient simulator in performing patient care activities, wherein the virtual instrument is selected from a group consisting of at least one IV needle, an ET tube, an ECG monitor, a BP cuff, a pulse oximeter cuff, a temporary external pacer, an AED, a manual defibrillator, and a virtual stethoscope;

means for sensing an interaction between the virtual instrument and the simulator, and means for providing feedback to the user regarding the interaction between the virtual instrument and the simulator.

2. The system of claim 1 wherein the virtual instrument and the simulator are tangible objects.

3. The system of claim 2 wherein the means for providing feedback to the user regarding the interaction between the virtual instrument and the simulator is a microcontroller.

4. The system of claim 2 wherein the means for providing feedback to the user regarding the interaction between the virtual instrument and the simulator is a computer program.

5. The system of claim 1 wherein the virtual instrument and the simulator are software-generated objects.

6. The system of claim 1 wherein the virtual instrument is a PA catheter.

7. The system of claim 1 wherein the virtual instrument is a virtual stethoscope.

8. An interactive education system for teaching patient care to a user, the system comprising:
   a patient simulator;
   a virtual stethoscope for use with the patient simulator in performing patient care activities;
   means for sensing an interaction between the virtual stethoscope and the simulator, and
   means for providing feedback to the user regarding the interaction between the virtual stethoscope and the simulator.

9. The system of claim 8 wherein the simulator is a tangible object.

10. The system of claim 9 wherein the simulator represents an adult patient.

11. The system of claim 9 wherein the simulator represents a non-adult patient.

12. The system of claim 9 wherein the simulator represents a portion of a patient.

13. The system of claim 8 wherein the virtual stethoscope is a tangible object.

14. The system of claim 13 wherein the means for sensing an interaction between the virtual stethoscope and the simulator is a sensor.

15. The system of claim 14 wherein the sensor is disposed on the patient simulator.

16. An interactive education system for teaching patient care to a user, the system comprising:
   a patient simulator;
   a virtual stethoscope for use with the patient simulator in performing patient care activities, wherein the virtual stethoscope is a tangible object;
   a sensor for sensing an interaction between the virtual stethoscope and the simulator, wherein the sensor is disposed on a skin overlay which is removably attached to the patient simulator, and
   means for providing feedback to the user regarding the interaction between the virtual stethoscope and the simulator.

17. The system of claim 14 wherein the sensor further comprises:
   (i) a RF ID tag; and
   (ii) a coil connected to the RF ID tag for broadcasting a unique set of RF signals.

18. The system of claim 17 wherein the virtual stethoscope further comprises:
   (i) a bell;
   (ii) an RF receiver disposed in the bell for receiving the unique set of RF signals from the sensor when the bell is brought within a predetermined proximity of the sensor; and
   (iii) means for interpreting the identity of the sensor, and playing a realistic body sound to the user based on the anatomical position of the sensor on the simulator.

19. The system of claim 18 wherein the means for interpreting the identity of the sensor, and playing a realistic body sound to the user based on the anatomical position of the sensor on the simulator, comprises:
   (i) an acquisition circuit connected to the RF receiver for matching the received RF signals to a predetermined signal profile for the sensor; and
   (ii) a sound control circuit connected to the acquisition circuit for directing a speaker to play a realistic body sound to the user, the sound being predetermined for the anatomical position of the sensor on the simulator.

20. The system of claim 19 wherein the sound control circuit is operably attached to a switch for selecting among a group of predetermined sounds.

21. The system of claim 20 wherein the sounds are heart sounds.

22. The system of claim 20 wherein the sounds are lung sounds.

23. The system of claim 20 wherein the sounds are Korotkoff sounds.

24. The system of claim 8 further comprising a program comprising software for execution on a computer.

25. The system of claim 24 wherein the program is disposed on a CD-ROM.

26. The system of claim 24 wherein the virtual stethoscope is a software-generated object having movement corresponding with movement of a mouse of the computer.

27. The system of claim 26 wherein the simulator is a software-generated object.

28. The system of claim 27 wherein the simulator represents an adult patient.

29. The system of claim 27 wherein the simulator represents a non-adult patient.

30. The system of claim 27 wherein the simulator represents a portion of a patient.

31. The system of claim 27 wherein the means for providing feedback to the user regarding the interaction between the virtual stethoscope and the simulator comprises a predetermined realistic body sound played by the program when the virtual stethoscope is placed on the correct anatomical position of the simulator for hearing the sound.

32. An interactive education system for teaching patient care to a user, the system comprising:
   a program comprising software for execution on a computer;
   a patient simulator, wherein the simulator is a software-generated object;
   a virtual stethoscope for use with the patient simulator in performing patient care activities, wherein the virtual stethoscope is a software-generated object having movement corresponding with movement of a mouse of the computer;
   means for sensing an interaction between the virtual stethoscope and the simulator, and
   means for providing feedback to the user regarding the interaction between the virtual stethoscope and the simulator, wherein the means for providing feedback to the user regarding the interaction between the virtual stethoscope and the simulator comprises a glow which surrounds the virtual stethoscope when the virtual stethoscope is placed on the correct anatomical position of the simulator for hearing a predetermined realistic body sound.

33. An interactive education system for teaching patient care to a user, the system comprising:
   a patient simulator having a sensor disposed on a skin overlay which is removably attached to the patient simulator;

a virtual stethoscope for use with the patient simulator in performing patient care activities; and an interface module having:
(i) means for sensing an interaction between the virtual stethoscope and the simulator, and
(ii) means for providing feedback to the user regarding the interaction between the virtual stethoscope and the simulator.

34. The system of claim 33 wherein the sensor comprises:
(i) a RF ID tag; and
(ii) a coil connected to the RF ID tag for broadcasting a unique set of RF signals.

35. The system of claim 34 wherein the virtual stethoscope further comprises:
(i) a bell;
(ii) an RF receiver disposed in the bell for receiving the unique set of RF signals from the sensor when the bell is brought within a predetermined proximity of the sensor; and
(iii) means for interpreting the identity of the sensor, and playing a realistic body sound to the user based on the anatomical position of the sensor on the simulator.

36. The system of claim 35 wherein the means for interpreting the identity of the sensor, and playing a realistic body sound to the user based on the anatomical position of the sensor on the simulator, comprises:

(i) an acquisition circuit connected to the RF receiver for matching the received RF signals to a predetermined signal profile for the sensor; and
(ii) a sound control circuit connected to the acquisition circuit for directing a speaker to play a realistic body sound to the user, the sound being predetermined for the anatomical position of the sensor on the simulator.

37. The system of claim 36 wherein the sound control circuit is operably attached to a switch for selecting among a group of predetermined sounds.

38. An interactive education system for teaching patient care to a user, the system comprising:
a patient simulator having a passive sensor capable of emitting at least two identifying frequencies upon receiving a sufficiently strong carrier signal to identify the sensor; and
a virtual stethoscope for use with the patient simulator in performing patient care activities, the virtual stethoscope having:
an acquisition coil for broadcasting a carrier signal to excite the sensor when brought within a predetermined proximity of the sensor;
an acquisition circuit to identify the emitted identifying frequencies; and
a sound circuit to play an appropriate body sound for the anatomical position of the sensor.

* * * * *

UNITED STATES PATENT AND TRADEMARK OFFICE
CERTIFICATE OF CORRECTION

PATENT NO. : 6,527,558 B1
DATED : March 4, 2003
INVENTOR(S) : Eggert et al.

It is certified that error appears in the above-identified patent and that said Letters Patent is hereby corrected as shown below:

Title page,
Item [73], Assignee, please update the assignee to read as follows:

-- Gaumard Scientific Company, Inc., Miami, FL (US) --

Signed and Sealed this

Twenty-eighth Day of September, 2004

JON W. DUDAS
*Director of the United States Patent and Trademark Office*